(12) United States Patent
Balakrishnan et al.

(10) Patent No.: US 8,798,566 B2
(45) Date of Patent: Aug. 5, 2014

(54) RAPID AUTONOMOUS SCAN IN FM OR OTHER RECEIVERS WITH PARALLEL SEARCH STRATEGY, AND CIRCUITS, PROCESSES AND SYSTEMS

(75) Inventors: Jaiganesh Balakrishnan, Bangalore (IN); Dhananjay Sangappa Awaji, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 306 days.

(21) Appl. No.: 13/173,047

(22) Filed: Jun. 30, 2011

(65) Prior Publication Data

US 2012/0252394 A1  Oct. 4, 2012

(30) Foreign Application Priority Data

Mar. 30, 2011 (IN) .......................... 1010/CHE/2011

(51) Int. Cl.
*H04B 1/18* (2006.01)
(52) U.S. Cl.
USPC ........ 455/161.1; 455/313; 455/334; 370/350; 370/503
(58) Field of Classification Search
USPC ...................................... 455/161.1
See application file for complete search history.

(56) References Cited

U.S. PATENT DOCUMENTS

| | | | |
|---|---|---|---|
| 5,347,284 A * | 9/1994 | Volpi et al. ..................... 342/356 |
| 7,787,630 B2 | 8/2010 | Lerner et al. |
| 2002/0080769 A1 * | 6/2002 | Spencer et al. ................ 370/350 |
| 2007/0294496 A1 | 12/2007 | Goss et al. |
| 2008/0320529 A1 | 12/2008 | Louchkoff et al. |
| 2009/0111389 A1 | 4/2009 | Grushkevich et al. |
| 2009/0111519 A1 | 4/2009 | Grushkevich |
| 2009/0191828 A1 | 7/2009 | Ibrahim et al. |
| 2009/0247099 A1 | 10/2009 | Jaisimha et al. |
| 2009/0311982 A1 | 12/2009 | Zhang et al. |
| 2010/0099371 A1 | 4/2010 | Brummelman |
| 2010/0232548 A1 | 9/2010 | Balakrishnan et al. |
| 2010/0296007 A1 | 11/2010 | Cooper |
| 2011/0047569 A1 | 2/2011 | Mears et al. |
| 2011/0051868 A1 | 3/2011 | Roufoogaran |
| 2011/0053510 A1 | 3/2011 | Bolton et al. |
| 2011/0096875 A1 | 4/2011 | Amrutur et al. |
| 2011/0111714 A1 | 5/2011 | Balakrishnan et al. |
| 2011/0306313 A1 | 12/2011 | Jaisimha et al. |
| 2011/0312292 A1 * | 12/2011 | Mo et al. ..................... 455/226.1 |
| 2012/0026039 A1 | 2/2012 | Ganeshan et al. |

FOREIGN PATENT DOCUMENTS

EP    1487122 A1 * 12/2004 ............... H04B 1/28

OTHER PUBLICATIONS

Broadcom. BCM2049 Product Brief, 2pp. 2009. Both Figs.

* cited by examiner

*Primary Examiner* — Ajibola Akinyemi
(74) *Attorney, Agent, or Firm* — Ronald O. Neerings; Frederick J. Telecky, Jr.

(57) ABSTRACT

A wireless receiver scan circuit (10) including a low-IF derotator (210) with signal band and image band outputs, and search circuitry (80, 200) operable to parallelize (100) a frequency-scanning search by determination of the presence and absence of a transmission in both the signal band and the image band. Other circuits, systems and processes are also disclosed.

49 Claims, 9 Drawing Sheets 1-steps, 3-step 1-steps, 2-step; 1-steps, 3-step

RAPID AUTONOMOUS SCAN IN FM OR OTHER RECEIVERS WITH PARALLEL SEARCH STRATEGY, AND CIRCUITS, PROCESSES AND SYSTEMS

CROSS-REFERENCES TO RELATED APPLICATIONS

This application is related to India Patent Application 1010/CHE/2011 "Rapid Autonomous Scan in FM or Other Receivers with Parallel Search Strategy, and Circuits, Processes and Systems" (TI-69599IndiaPS) filed Mar. 30, 2011, for which priority is claimed under the Paris Convention and 35 U.S.C. 119 and all other applicable law, and which is incorporated herein by reference in its entirety.

This application is related to U.S. Patent Application Publication 20110111714, "Method and System for False Frequency Lock Free Autonomous Scan in a Receiver" dated May 12, 2011, (TI-67295), which is incorporated herein by reference in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND

This invention pertains to scannable wireless receivers generally. Without limitation, the background is described in connection with FM receivers. FM is popular in many developed countries and is growing in popularity in a number of developing countries.

In the United States and Europe, FM broadcast stations use a bandwidth of 200 KHz assigned to them at different frequencies or positions within the 87.5 MHz to 108 MHz. In Japan the FM band or available frequency spectrum is a 76 MHz to 90 MHz band. There, an FM channel can be centered at multiples of 50 KHz, with a frequency spacing of at least 200 KHz between any two valid stations. The FM center frequency can be centered at multiples of 50 KHz in some parts of the world and at multiples of 100 KHz in other parts of the world. Hence, scanning for FM bands at multiples of 50 KHz or multiples of 100 KHz are two useful operations.

With the growing popularity of FM transmission all over the world, low-cost integrated FM receivers have become important to integrate into mobile handsets like cell phones and Internet devices as well as FM-supporting integrated circuits of various types for those and other products.

In an FM receiver, band scan time herein is defined as the total time taken to scan the entire FM band, in the absence of any valid FM broadcast stations. For example, a tune time of 40 ms/channel over 200 stations can result in a total band scan time of 8 seconds, which may constrain or limit the user experience for at least some users.

The time taken to scan the entire band and automatically identify valid FM broadcast station is a key care-about as it is perceivable by the user. To cover the entire FM band from 87.5 MHz to 108 MHz calls for time-intensive scanning as many as 200 station slots at 100 KHz spacing. In some countries, the FM center frequencies can occupy a 50 KHz raster, calling for autonomous scan with a frequency spacing of 50 KHz, which doubles the FM band scan time, all other things being equal. Thus, the FM band scan time is problematically longer there, in the sense of a numerical bound, by the time taken to tune to each of the about 400 channels (at 50 KHz channel spacing) and identify the presence of a valid station.

Hitherto, it is believed that an approach involved a frequency synthesizer to scan channel-by-channel for an FM station and lock on to it, and that such approach attempted to reduce synthesizer lock time by using a higher reference clock rate. Unfortunately, such approach is not believed to accommodate a low clock rate 32 KHz reference clock. Low power mobile handset applications and other microprocessor-supported applications commonly use a 32 KHz reference clock such as for a real-time clock (RTC), and finding some distinct departures to rapidly scan FM stations in a low power mobile handset or other microprocessor-supported applications would be most desirable.

SUMMARY OF THE INVENTION

Generally, and in one form of the invention, a wireless receiver scan circuit includes a low-IF de-rotator with signal band and image band outputs, and search circuitry operable to parallelize a frequency-scanning search by determination of the presence and absence of a transmission in both the signal band and the image band. Other circuits, systems and processes are also disclosed.

Generally, and in a process form of the invention involving frequency scan for a wireless receiver, the process includes capturing an image band and a signal band in parallel, with the image band situated in advance of the signal band in a direction of scan, electronically evaluating the image signal band and channel signal band to determine whether each band is invalid or not, storing an identification of the image band when evaluated invalid, and advancing the frequency of capture until a latest signal band is reached corresponding to the stored identification of the invalid image band and then jumping over such band until a signal band to be captured no longer corresponds to a stored identification of an invalid image band.

Generally, another process form of the invention involves a wireless signal band searching process having a tuning direction and including automatically tuning a receiver to a specified channel frequency to deliver a signal channel and an image channel separate from each other, electronically measuring at least one primary metric for the signal channel and electronically evaluating whether the signal channel has any signal that satisfies a criterion based on the at least one primary metric, when the signal channel fails such criterion, then branching to an inside loop to analogously evaluate the image channel relative to a similar criterion, and when the image channel fails the similar criterion, then record-keeping by electronically entering an indication of the image frequency into an invalid-channel record. The process further includes adjusting a channel frequency specifying value to re-specify a channel frequency in the tuning direction; accessing the invalid channel record based on the adjusted channel frequency specifying value to determine whether the re-specified channel frequency is indicated as an invalid channel, and if so, then electronically repeating the adjusting and accessing until such invalid channel indication is absent for a currently adjusted value; and then repeating two or more of the tuning, electronic measuring, electronic evaluating, record-keeping, adjusting, and accessing steps until a signal channel reached that satisfies the criterion.

Generally, and in another form of the invention, a power managed circuit includes a de-rotation circuit having a signal channel output and a separate image channel output, a first low pass filter and a second low pass filter connected to said signal channel output and said image channel output respectively, a signal strength module coupled for measuring respective signal strengths from said first low pass filter and from said second low pass filter, and a power management circuit operable for frequency scanning based at least in part on said signal strength module and further operable to selectively enable and disable the first low pass filter and said second low pass filter alternately during the frequency scanning and to disable said second low pass filter after such frequency scanning is completed.

Generally, and in a further form of the invention, an integrated circuit system includes a receiver tunably operable to receive signal channels, at least one coexisting radio, and a processor operable to control the at least one coexisting radio, and further to control the receiver in a channel scanning mode that concurrently receives multiple channels and that retunes the receiver based on invalid-channel information derived from the receiver in the multiple channels to at least sometimes jump by plural channels in the frequency scanning mode.

Generally, a further process form of the invention involves a frequency scanning process having a tuning direction and for scanning a band of channels having a nominal channel width. The process includes tuning a wireless receiver based on specified channel frequency to receive plural signal channels and plural image channels, de-rotating the plural signal channels and plural image channels to a signal output and to a separate image output, and filtering the signal output with a passband at least twice the nominal channel width and filtering the image output with a passband at least twice the nominal channel width thereby to provide a signal filter output substantially free of image channels and an image output substantially free of signal channels. The process further includes electronically measuring the signal filter output as a whole to determine whether it is the case that both A) the plural signal channels are substantially empty of valid signals and B) the plural image channels are substantially empty of valid signals, and when that case is present, electronically entering into a storage one or more identifiers representing the plural image channels. The process further includes adjusting a channel frequency specification value to represent a re-specified channel frequency in the tuning direction, accessing the storage to determine whether the re-specified channel frequency is indicated as an invalid channel, and if so, then repeating the adjusting and accessing until such indication is absent; and then repeating to retune in the tuning direction based on the respecified channel frequency, and perform the electronic measuring and evaluating, adjusting and accessing steps until a set of signal channels is reached that has that least one valid signal.

Other circuits, devices, systems, and processes are also disclosed and claimed.

Corresponding numerals in different Figures indicate corresponding parts except where the context indicates otherwise. A minor variation in capitalization or punctuation for the same thing does not necessarily indicate a different thing. A suffix .i or .j refers to any of several numerically suffixed elements having the same prefix.

DETAILED DESCRIPTION OF EMBODIMENTS

Among other advantages of embodiments are dramatically reduced band scan time, capability to search by autonomous scan in both forward (up) and reverse (down) directions, and finding all stations with valid transmissions in such band, e.g. in an 87.5-108 MHz FM band. Moreover, some embodiments are directed to scanning other signal bands in which the stations have some form of modulation, such frequency modulation FM, phase modulation, amplitude modulation AM, double sideband, single sideband, and combined forms of modulation such as in television TV and HDTV bands, frequency division multiplex (FDM) or otherwise.

Some of the embodiments solve scan time problems by employing parallel search strategies in a receiver integrated circuit 10 to drastically reduce the band scan time during autonomous scan.

Some embodiments use a cyclic buffer to store list of channels with invalid transmissions, and reduce the band scan time during autonomous scan in a receiver.

Some embodiments provide forward (up)/reverse (down) frequency search direction of autonomous scan, and further provide an appropriate choice or instantiation of High/Low side tuning of a synthesizer, depending on up/down direction, that enables parallel search strategy.

Some embodiments provide sequential computation in a noise meter for both the signal and image bands, without requiring a retune, to identify the absence of a valid transmission when the noise floor exceeds the RSSI threshold used.

Some embodiments provide still other remarkable structure and process improvements.

Figure 1:
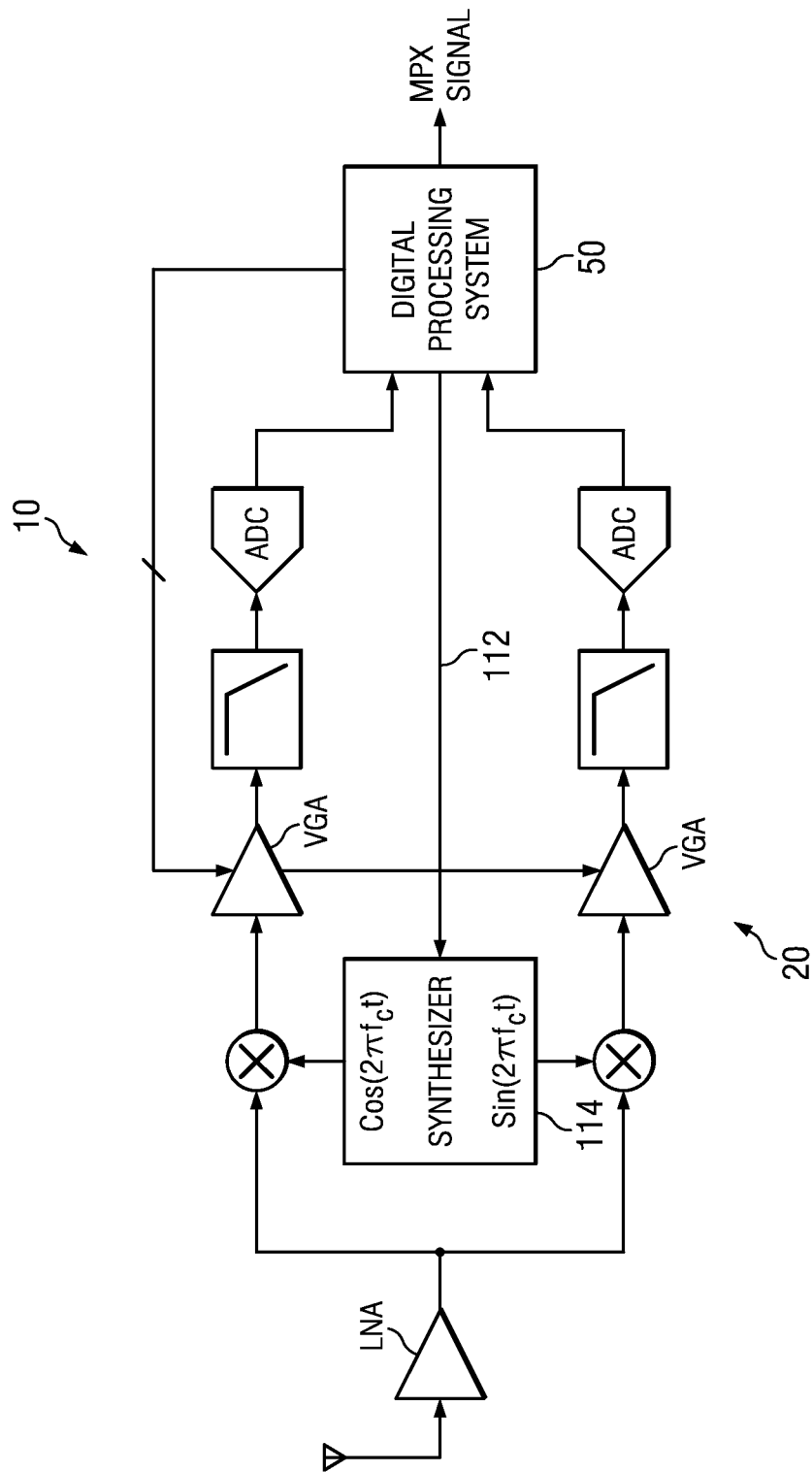
FIG. 1 is a block diagram of a receiver embodiment improved as in the other Figures.
Figure 2:
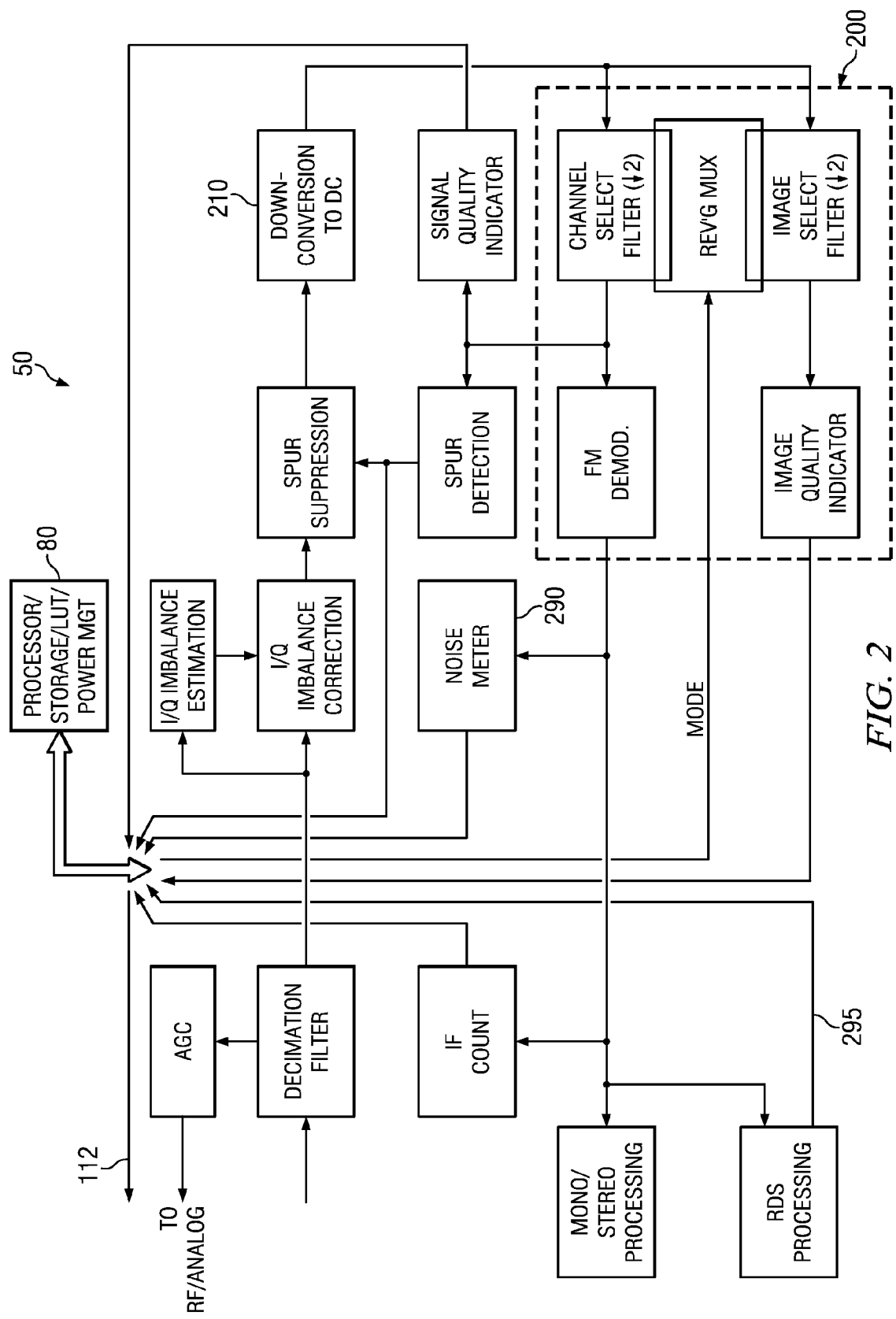
FIG. 2 is a partially block, partially process, diagram detailing a digital processing embodiment for a section of the receiver in FIG. 1.
Figure 5:
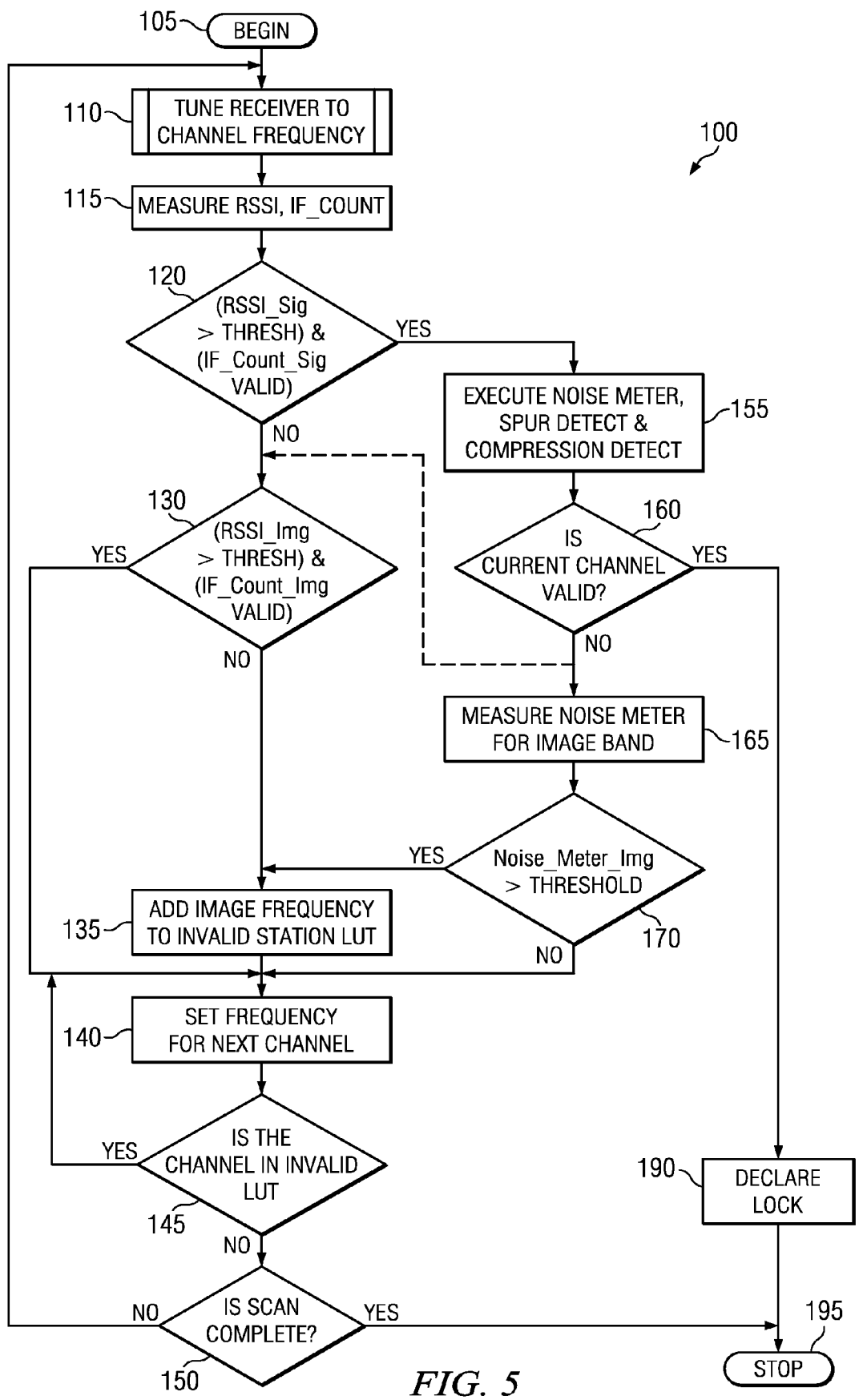
FIG. 5 is a process flow diagram for a process embodiment for rapid scan of bands of FIG. 3 with decreased band scan time, and the FIG. 5 flow diagram also represents either firmware or a state transition diagram for implementation in the digital processing embodiment of FIG. 2.

In FIG. 1, an FM receiver embodiment 10 has an RF front end 20 followed by a digital processing section 50. In FIG. 2, the digital processing section 50 has a processor 80 (including a storage circuitry) that configures, controls and executes the illustrated process blocks in digital processing section 50. Digital processing section 50 includes a baseband section 200 of FIG. 2, which is further detailed in FIG. 6 and coordinated with FIG. 5. FIG. 5 shows a control flow 100 applied by processor 80 to baseband section 200, and FIG. 6 details blocks to which the control flow 100 is applied. (The control flow 100 is also applied to or responsive to more than the blocks in the base-band section (e.g., Synthesizer tuning, IF count measurement, Noise meter measurement, etc).

Figures 6, 7:
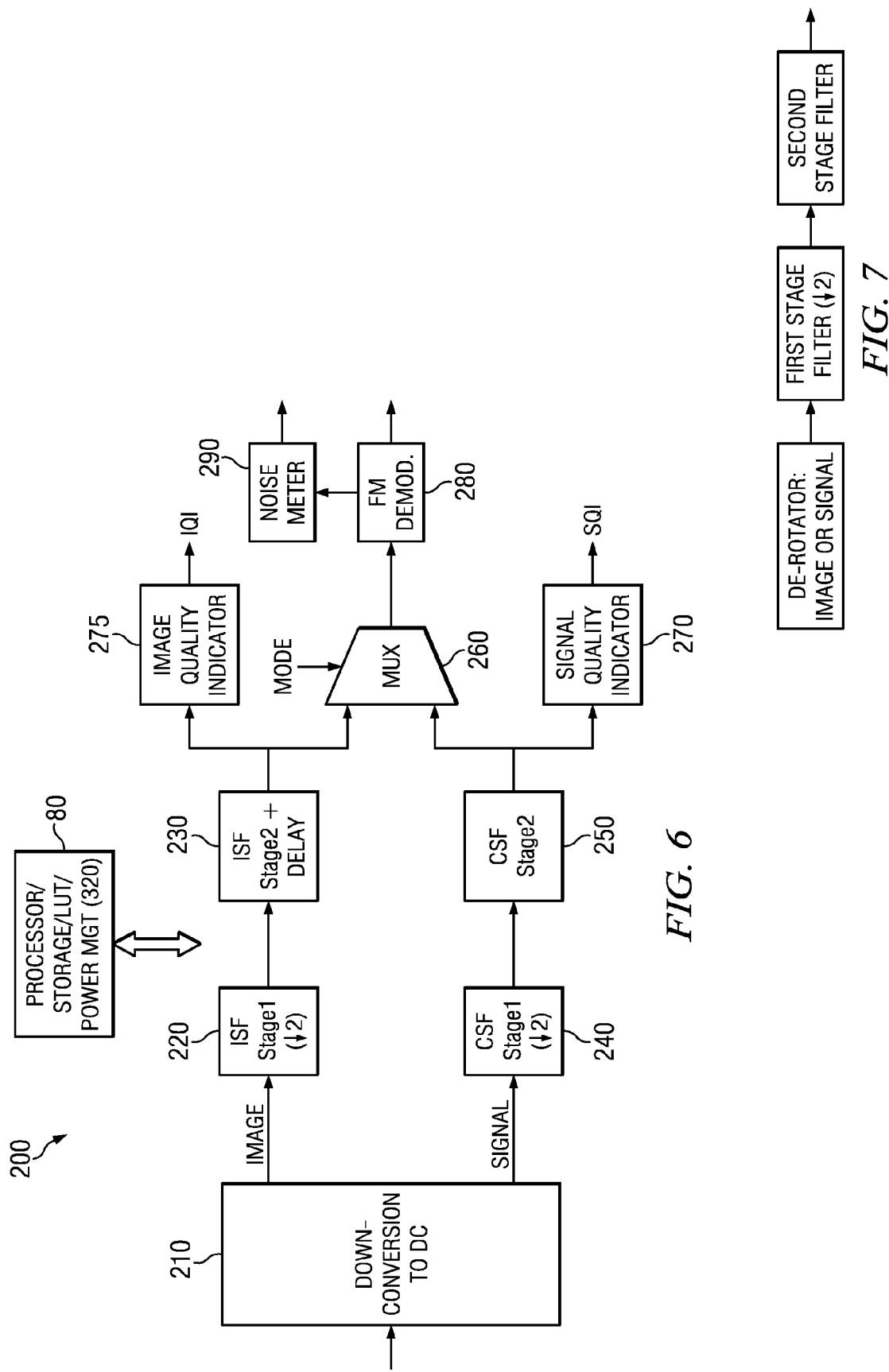
FIG. 6 is a process flow or block diagram detail for mode-driven channel signal filtering and image signal filtering and multiplexing prior to demodulation in the digital processing embodiment of FIG. 2.
FIG. 7 is a block diagram of a two-stage filter example for use in the filtering in FIG. 6 or FIG. 8.

Note in FIGS. 1 and 5 the digital processing system 50 has A) operations that control a frequency synthesizer 114 in RF front end 20 to tune to one or more channels pertaining to a frequency position in the band, as well as B) control operations in baseband section 200 of FIGS. 2 and 6 that are focused on channel and image filtering blocks just ahead of demodulation and can also utilize measurements that follow or are derived from demodulation. In a receiver embodiment, as in FIG. 1 for example, a frequency synthesizer is controlled to tune to one or more channels in the band concurrently, and further control operations involve channel and image filtering blocks in section 200 prior to demodulation (e.g., FM demod). Post-demodulation measurements are executed on a signal channel, and at least one more channel such as an image channel, and noise.

In FIGS. 1, 2 and 5, scan of each FM station has circuits or process modules for (i) Synthesizer Tuning (ii) AGC convergence (iii) I/Q Imbalance Estimation and (iv) Measuring the metrics described elsewhere herein to determine a valid station or an invalid/empty channel. In one example, these might consume about 25 ms/channel leading to a band scan time of about 5 seconds. In FIG. 1, a low noise amplifier LNA amplifies signals from an antenna and feeds the amplified signals to quadrature down converters (X) for which the synthesizer 114 provides quadrature local oscillator signals $\cos(2\pi f_{LO} t)$ and $\sin(2\pi f_{LO} t)$. A variable gain amplifier VGA for each quadrature path I, Q supplies an output to a low pass or band pass filter to recover a desired product of down conversion at an intermediate frequency (IF), after which is ADC (analog to digital conversion) to provide digital signal inputs in quadrature to digital processing system 50. The digital processing system 50 feeds back respective automatic gain controls AGC to each VGA. Digital processing system 50 supplies an FM broadcast multiplex signal MPX at baseband and applies stereo decoding to deliver left and right channel stereo audio as its output, see FIGS. 1, 2 and 4.

In FIG. 2, some embodiments provide all the digital blocks by an electronic circuit 50 for the FM receiver that has an electronic processor 80 for down-conversion of modulated FM to baseband and also to demodulate and process resulting demodulated FM audio and RDS. An electronic instruction storage is included with the electronic processor 80 so that the electronic processor operates in accordance with the instructions as taught here and stored in the storage. FIG. 5 for instance represents operations that are suitably implemented by such stored instructions for such embodiments. At least a portion of storage represents the various blocks as shown in FIG. 2, such as decimation filters, AGC, RSSI, DC Offset, IQ Imbalance estimation and correction, spur suppression, down-conversion 210, baseband processing 200 including filtering, spur detection, and FM demodulation, see also block 280 of FIG. 6. Further, such storage has blocks for downstream difference filtering, MPX LPF, MPX DCO estimation and correction and IF count, and mono/stereo decoding from the MPX signal of FIG. 4, and volume control thereof, and RDS processing.

In FIGS. 1, 2 and 5, scanning for presence of a valid station or an invalid channel is determined by tuning in a step 110 to an FM channel, for instance, measuring various metrics, and checking if each of them satisfies a pre-defined criterion. Digital processing system 50 in FIGS. 1 and 2 supplies controls via a line 112 to synthesizer 114 to control the tuning according to step 110. A step 115 in FIG. 5 measures primary metrics RSSI (SQI and/or ISI Received Signal Strength Indicator) and IF Count (nominal center frequency of the in-band channel). IF count block detects existence of signal, if the absolute value of the IF count is below a threshold value $\Delta f$ based on a maximum expected mismatch (e.g., +/−200 ppm or about 21.6 KHz) between frequencies of a remote transmitter and the receiver 10. If a decision step 120 determines that the RSSI and IF Count indicate the presence of a potential FM signal, then a FIG. 5 step 155 uses secondary metrics for confirmation and thereby further reduces the probability of false locks or avoids false locks entirely. Secondary metrics include any one, some or all of: a measure of the noise in the desired band herein called Noise Meter 290 in FIGS. 2, 4 and 6, and secondary metrics from a Spur Detector and Compression Detector inside the processor in FIG. 2.

Figure 4:
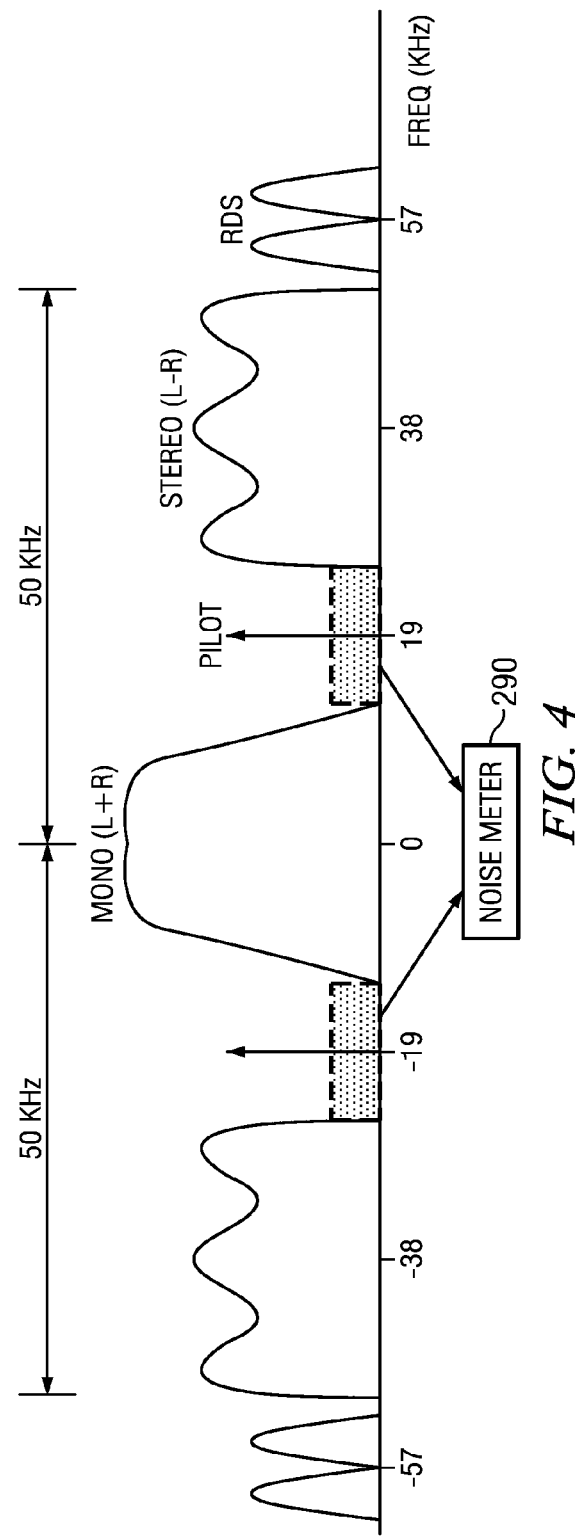
FIG. 4 is a spectrum diagram of amplitude versus frequency and detailing a signal channel band of FIG. 3 for an FM stereo broadcast transmission converted to baseband and FM demodulated in an FM version of the receiver embodiment of FIGS. 1-3.

For example, Noise Meter 290 electronically measures 15 KHz to 23 KHz noise energy in demodulated MPX of FIG. 4, and e.g. has a product detector multiplying MPX times 19 KHz locked to pilot, the product detector feeding a DC-rejecting, low-pass 4 KHz filter to obtain the noise, and the filter in turn feeding an energy-measuring process such as sum-of-squares (less average-squared) over time, to deliver a noise energy estimate. The spur detector at step 155 can auto-correlate the signal to electronically detect its existence and energy, such as by determining the difference of auto-correlations at zero lag and at a larger lag (at which signal auto-correlation is low and spur auto-correlation is about the same as at zero lag), and thresholding the difference. The compression detector can detect existence of desired signal as indicated by interfering harmonic components less than a threshold, e.g. threshold of a difference magnitude between RSSI values of the signal obtained by setting synthesizer 114 to each of two frequencies somewhat offset from each other. Also, for some background on an IF count, a spur detector, a compression detector, and a noise detector, see the US Patent Application Publication 20110111714, "Method and System for False Frequency Lock Free Autonomous Scan in a Receiver" dated May 12, 2011 (TI-67295), which is hereby incorporated herein by reference.

Figure 3:
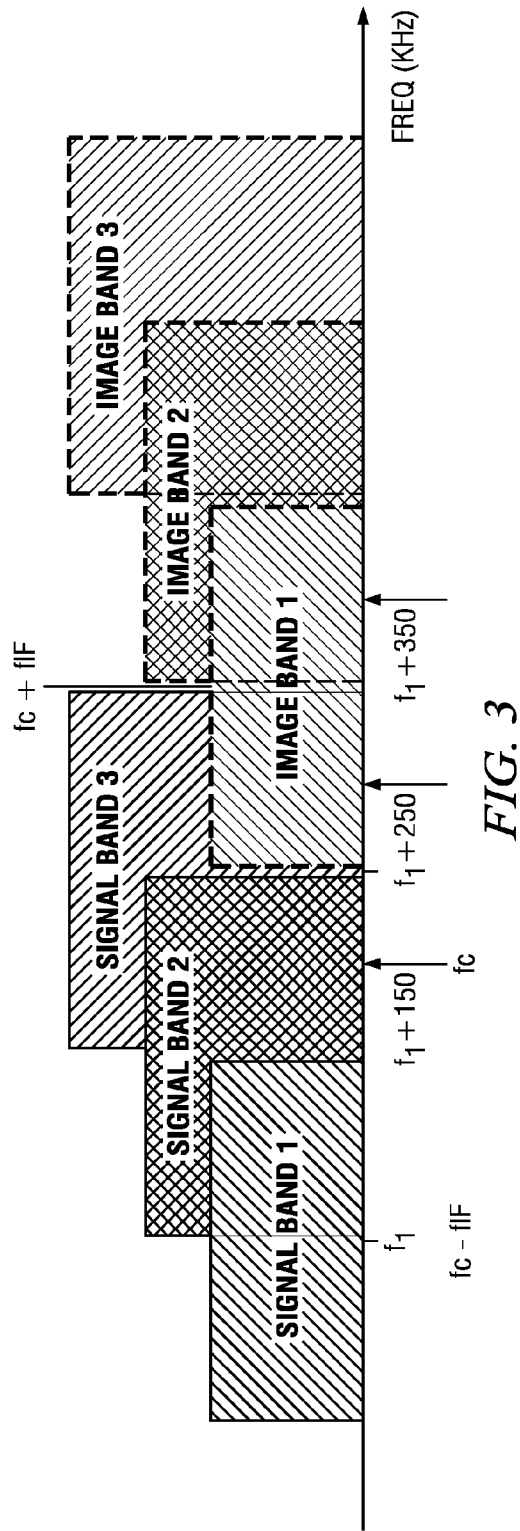
FIG. 3 is a spectrum diagram versus frequency of three pairs of signal channel and image bands to portray a process embodiment for rapid scan of 100 KHz channels in pairs with consequently decreased band scan time.

In FIG. 3, three pairs of signal and image bands portray a process embodiment for rapid scan with decreased band scan time. At RF, each pair 1, 2, or 3 of bands has a signal band and an image band and a pair-specific center frequency $f_C$ centered between the signal band and image band of the pair. From the FIG. 1 RF front-end viewpoint, center frequency $f_C$ corresponds to synthesizer 114 frequency $f_{LO}$ applicable to the given pair. From the FIG. 2 down conversion to DC viewpoint, center frequency $f_C$ corresponds to DC, or zero frequency. FIG. 3 represents a composite diagram of the three pairs of signal and image bands. To visually distinguish the pairs from each other for purposes of illustration, the heights of the signal band and image band in the same pair are the same height, and the heights of the bands in different pairs are cosmetically depicted with different heights.

In one low-IF system example, the receiver can be arranged so that the signal band for stereo reception can be centered at either (fc+$f_{IF}$) or (fc−$f_{IF}$) at the output of the FIG. 1 RF/analog mixer. Without loss of generality, in FIG. 3 call the band centered at $f_1$=(fc−$f_{IF}$) the channel signal band and the band centered at (fc+$f_{IF}$) the image band. Processor 80 is programmed or configured to control the synthesizer 114 along line 112 to tune to a programmed frequency $f_{LO}$ as discussed for FIG. 5 and TABLE 1. The frequency $f_{LO}$ of the synthesizer 114 and the RF/analog mixers (X) and filters in FIG. 1 are set to deliver frequency subtraction, and the channel band in FIG. 3 corresponds to (fc−$f_{IF}$) for a received on-air signal and the image band corresponds to (fc+$f_{IF}$). For instance, one embodiment has a low IF with $f_{IF}$=150 KHz, and the embodiment simultaneously measures an SQI (Signal Quality Indicator) as the RSSI in the signal band ($f_S$=$f_1$ in FIG. 3) and an IQI (Image Quality Indicator) as the RSSI in the image band ($f_1$+300) KHz.

In FIGS. 3 and 5, parallel search strategy confers a 2× performance enhancement that desirably reduces scan time by about half. FM receivers can employ a low-IF architecture to deal with analog impairments like flicker noise, DC offset and carrier leak-through. Other types of receivers may also be used with or in various embodiments. In the low-IF architecture depicted, the desired signal is first down-converted to an intermediate frequency (IF) in FIG. 1. The desired signal is subsequently processed by down-conversion, or de-rotation, in the digital processing followed by channel select filtering CSF in block 200 of the complex base-band signal. FM demodulation and stereo decoding follow afterwards, downstream of block 200.

The down-conversion to DC block in FIG. 2 is performed by a complex digital mixer 210 that frequency shifts the channel band to be centered at DC and outputs this (marked as Signal Band 1 in FIG. 3). Simultaneously, it frequency-shifts the image band (Image Band 1 in FIG. 3) to also be centered at DC and outputs this Image from FIG. 6 block 210 in parallel with the Signal output from block 210, see also FIG. 6 and representative equations later hereinbelow.

In FIGS. 2 and 3, the FM receiver embodiment provides special low-IF baseband section 200 to parallelize the search strategy by determining the absence of FM transmission in both the signal band and the image band. Advantageously, this parallelizing approach confers a factor of approximately 2× reduction in FM band scan time.

A LUT (lookup table) for processor 80 is used to maintain a list of subsequent invalid stations, i.e., if RSSI of image band is less than the threshold it is entered or included in the LUT list. A cyclic buffer of size 3 is sufficient for an IF of 150 KHz and channel raster with 100 KHz spacing. Thus, in the fourth row of TABLE 1, an invalid station frequency 87.8 is overwritten because it is more than three entries (cyclic buffer size 3) previous to the latest entry. A length six or more (L>=6) LUT is useful for 50 KHz channel spacing. Thus the length L of the LUT is suitably set in some embodiments at the number at least equal to a ratio 2*$f_{IF}$/W, i.e. ratio of twice the intermediate frequency divided by the spacing of the frequency raster W. In embodiments in which it is desirable to store more extensive information covering part or all of a band to be scanned, a LUT or storage for some set of records is sized with sufficient additional capacity.

In FIG. 5, description turns to an exemplary flow for firmware or for state machine for a 2× parallel search embodiment. Operations commence with a BEGIN 105 that initializes the LUT and sets a specified tuning frequency and then proceeds to a step 110 that actually tunes the receiver to the specified channel frequency, e.g. via line 112 in FIG. 1. Next, a step 115 measures two primary metrics—'RSSI' (windowed sum of squares from CSF for SQI) and FIG. 2 IF_Count—both metrics for the signal channel in FIGS. 2 and 3. Then a decision step 120 evaluates the primary metrics for the signal channel by determining whether or not it is true both that A) the RSSI of the signal channel exceeds a threshold (RSSI_Sig>Thresh) and B) IF_Count_Sig is valid for the signal channel.

If No at step 120—it is not true that both the primary metrics satisfy the conditions of step 120—then operations branch to a remarkable, time-efficient inside loop at decision step 130. If not already done at step 115, one or both primary metrics for the image channel are generated. Decision step 130 evaluates the image channel by determining whether it is true that both A) the RSSI of the image channel exceeds a threshold (RSSI_Img>Thresh) and B) IF_Count_Img is valid for the image channel. (Some embodiments omit to check validity of the IF count in the image band where it is sufficient to check the RSSI of the image channel before adding it to the invalid station LUT.) If No (at least one of the conditions is not met) at step 130, then operations proceed to a step 135 that adds the image frequency to the invalid station LUT (TABLE 1). Operations go from step 135, and otherwise from step 130 (Yes), to a step 140 that sets the frequency for the next channel such as by controlling the synthesizer 114 to change frequency, e.g. by 100 kHz in a given configured direction such as Up. After step 140, a decision step 145 determines whether the channel is already entered as Invalid in the LUT. If so (Yes), then operations branch back from decision step 145 to step 140 to again change the frequency by still another 100 kHz in the configured direction. The scanning embodiment remarkably employs this conditional branch-back 145, 140 so that the inside loop 130, 135, 140, 145, 150, 110, 115, 120 can move through empty parts of the frequency spectrum more than one channel at a time when appropriate.

Figure 5A:
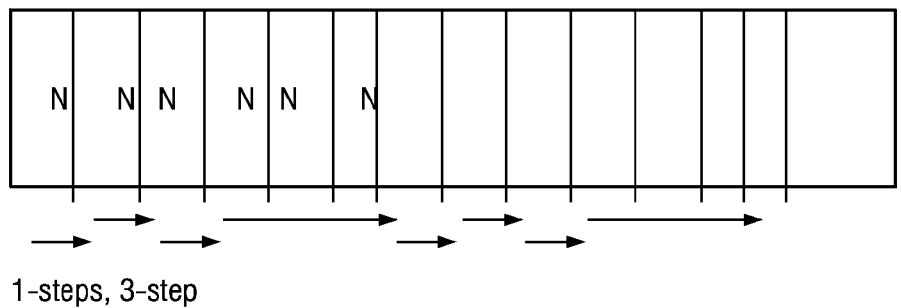
FIGS. 5A-5D are each a channel diagram of channel status entries versus frequency in different scenarios of operation in FIG. 5.

FIG. 5A illustrates the advantageous operation of this inside loop as it hop-scotches through a so-far empty frequency spectrum. Step 135 operates, when steps 120 and 130 determine that a signal and image channel pair are both invalid, to effectively mark the image channel invalid "N." Given a 150 kHz IF and 100 kilohertz channels, the image channel is the channel that is three channels (3=2×150/100) ahead of the current signal channel in the configured direction of frequency adjustment (e.g. Up). When the specified signal channel has no entry, as at far left, and steps 120 and 130 are both No, then a first image channel next-right is marked "N" in effect by step 135. Step 140 increments to the next channel after the current signal channel. Step 145 determines that next channel has no LUT entry (No at step 145), because that next channel is not the image channel that has just been marked invalid in the LUT by step 135. (Description of operations in the case of step (Yes) is provided in the next two paragraphs.) After step 145 (No), operations go to step 150. If scan is completed over the entire frequency band to be scanned (as determined by step 150 detecting that a range end has been reached by the frequency from step 140), then operations reach a Stop or RETURN 195. Otherwise, scan is not complete and operations proceed to step 110 and beyond to tune the synthesizer 114 for reception of the channel signal frequency specified by step 140.

TABLE 1 shows an operational sequence of pertinent frequencies and three-entry LUT contents as a scan process such as that of FIG. 5 is performed in a direction of increasing frequencies. Each cell in the fourth column TABLE 1 represents the state of the LUT corresponding to a given row, and each row corresponds to a given loop pass in FIG. 5. Careful inspection of TABLE 1 reveals a channel-by-channel progression of synthesizer frequencies $f_{LO}$, but then in a fourth row of TABLE 1 the synthesizer frequency jumps by more than one channel (e.g., four channels shown). This behavior involves instances of step 145 (Yes). To understand this, note that the FIG. 5 scan process starts at the 87.5 MHz low end of the FM broadcast band and hypothetically encounters invalid channels one by one for the first three channel signal frequencies 87.5, 87.6, 87.7 and their respective images 87.8, 87.9, 88.0. In each of these first three channel signal frequency cases and their loop passes represented by the first three rows of the first column, step 145 (No) finds no entry in the LUT representing the current signal channel for reception of which the frequency incrementing process of step 140 has reached.

On the succeeding loop pass, step 140 increments the synthesizer frequency so that the next channel signal to be received is situated at 87.8 MHz. Step 145 finds an entry representing that 87.8 channel in the LUT and branches via step 145 (Yes) back to step 140 to increment the synthesizer frequency. Then the branch-back 145, 140 occurs two more times for a total of three branch-backs in this one same loop pass before proceeding via step 150 back to step 110 to receive the channel signal at 88.1 MHz as indicated by the fourth row of TABLE 1. Accordingly, FIG. 5A shows three short 100 kHz arrows followed by a triple-length arrow representing the three branch backs. The process repeatedly checks three channels successively, and then jumps by three channels by means of the three branch backs to accomplish that jump. The process jumps by three channels because those latter three channels have been concurrently checked as image channels of the first three. In this way, the scanning process is sped up by a factor of substantially about 2× by this embodiment.

TABLE 1

LOOKUP TABLE (LUT)

| Signal Band $f_{Sig}$(MHz) | Synthesizer Freq $f_{LO}$ (MHz) | Image Band $f_{Irf}$(MHz) | Invalid Station LUT |
|---|---|---|---|
| 87.5 | 87.65 | 87.8 | {87.8, 0, 0} |
| 87.6 | 87.75 | 87.9 | {87.8, 87.9, 0} |
| 87.7 | 87.85 | 88.0 | {87.8, 87.9, 88.0} |
| 88.1 | 88.25 | 88.4 | {88.4, 87.9, 88.0} |
| ... | | | |

For further insight into the process embodiment of FIG. 5, suppose decision step 130 evaluates the image channel and both the primary metrics are satisfied instead. In that case, operations go directly from step 130 (Yes) directly to step 140 and bypass step 135. At some subsequent point, fewer than the three branch backs 145, 140 described above will occur because step 135 was just bypassed.

Now suppose that both conditions on RSSI_Sig and IF_Count are true at decision step 120 (Yes). In that case, operations proceed from step 120 to step 155 to generate secondary metrics, such as by executing Noise Meter, Spur Detect and Compression Detect for the signal channel only. Notice that both processing time and processing power consumed by scan are intelligently kept low because the step 155 generation of secondary metrics is kept out of the inside loop. Then a step 160 evaluates the secondary metrics to determine whether the current channel is valid. If the current channel is not valid as indicated by the secondary metrics, operations branch from step 160 (No) to a second loop starting with step 165 and exterior to the inside loop described hereinabove.

Thus, if the current channel is not valid as indicated by the secondary metrics of step 155 then operations branch from decision step 160 (No) to the step 165, which executes the noise meter process to measure noise for the image band. (RSSI, Spur Detect and Compression Detect for the image band may also be suitably included along with Noise Meter at step 165.) Notice that the process incorporates noise meter for the image band at step 165, and that computation is only performed depending on conditions determined not only at decision step 120 but also decision step 160. Consequently, not only processing time but also processing power consumed by the special 2× fast scan are intelligently saved because the step 165 noise meter process on the image band is likely to be often omitted.

After step 165, a decision step 170 threshold-evaluates the noise meter level according to the conditional expression Noise_Meter_Img>Thresh2. If the noise is excessive in the image channel as determined by step 170 (Yes), then operations go to step 135 to add the image frequency to the invalid station LUT. A channel adjustment occurs due to the step 140, and may subsequently jump due to branch-back steps 140, 145 on a later loop pass accessing that image frequency in the LUT as described earlier hereinabove. On the other hand, suppose the noise is not excessive in the image channel as evaluated by step 170 (No). In that case, operations branch from step 170 (No) directly to step 140 and bypass step 135. Step 140 sets the frequency for the next channel once this time, and no branch-back later occurs at step 145 based on that non-noisy image channel because that image channel is correctly not entered as invalid in the LUT.

In an alternative embodiment, steps 165 and 170 are omitted, and operations directed from step 160 (No) go instead to step 130, as indicated by a dotted line in FIG. 5. Such alternative embodiment also can beneficially employ power management to turn the noise meter on and off during frequency scan depending on whether signal channel is valid (yes) at step 120 without continuing to run the noise meter for the image channel at step 165. In either type of embodiment, operations reenter the inner loop somewhere if the signal channel fails the secondary metric(s).

FIGS. 5A-5D illustrate various scenarios that are remarkably accommodated by the process of FIG. 5. If the frequency is effectively adjusted by three channels as in TABLE 1, due to a just-completed pass through either the inside loop pass or the exterior loop, then the signal channel now reached by the jump, and its image channel, are newly evaluated by the process embodiment, as in FIG. 5A and have the three one-steps and one three-step jump as described hereinabove.

Figure 5B:
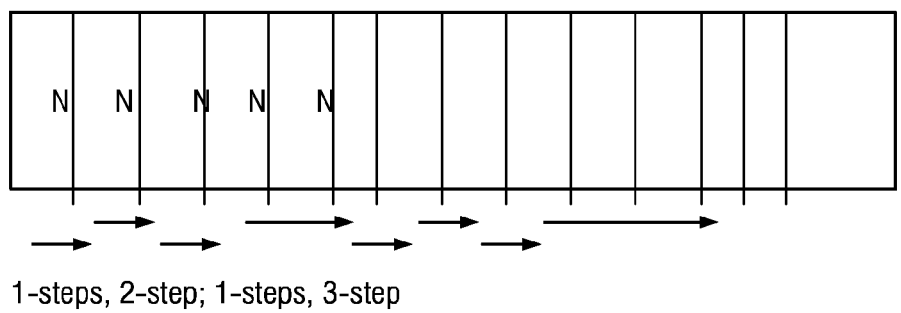

In FIG. 5B, suppose an image channel has been found not-invalid at step 130 or step 170, so that the LUT step 135 is bypassed and a third "N" is not entered next to the first two entries "NN." Then FIG. 5B illustrates a resulting two-step (two branch backs instead of three) so that the not-necessarily invalid image channel from that earlier loop pass now becomes the signal channel of a current loop pass. As a result, the process remarkably double checks the channel in question and in the illustrated scenario proceeds to still further channels if that channel does appear to be invalid. FIGS. 5A and 5B are abbreviated in frequency extent to show the operational behavior with empty or invalid channels, and the process behavior when a valid station S is reached is depicted in connection with FIGS. 5C and 5D.

Figure 5C:
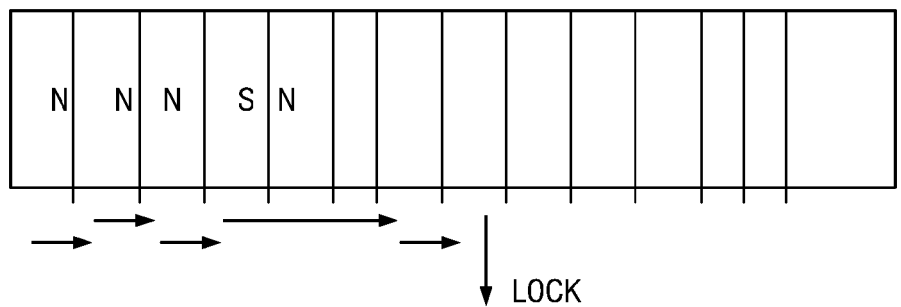

FIG. 5C illustrates a scenario wherein an actual station S occupies a channel first evaluated as a signal channel of FIG. 5A. Returning to FIG. 5, operations in pertinent part have reached step 120, find the conditions on the primary metrics of step 120 met in full, and branch to step 155. Step 155 and step 160 generate and evaluate the secondary metrics and determine that the current channel is valid at step 160. Operations branch from step 160 to a step 190 that sets a Lock field in a register that holds the current channel frequency or channel number N. After step 190, a Stop or RETURN 195 is reached, whereupon processing can do other operations unrelated to frequency scan.

Figure 5D:
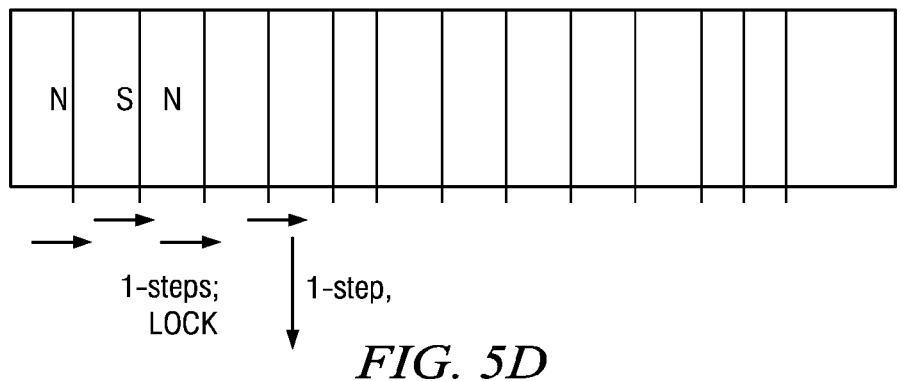

FIG. 5D illustrates the alternative scenario wherein the actual station S occupies a channel first evaluated as an image channel, the one in the middle of a set of three image channels evaluated in successive loop passes. The channel for Station S is not entered into the LUT, but its adjacent two image channels are entered into the LUT (N, —, N). Under this FIG. 5D scenario, a signal channel earlier was not-passed either at step 120 (No) or 160 (No), but the image channel containing station S passed (not-invalid) at step 130(Yes) or step 170 (No) so that step 135 was bypassed. More recently, and due to a step 140 single-step, that image channel becomes the new signal channel on the next pass. As the new signal channel, station S passes steps 120 and 160 and a Lock is declared at step 190.

In FIG. 5, signal and image are handled, or responded to, in different, asymmetric ways. The reason is that tests that are done on the 'signal' are to check if it is a valid FM station. If yes, the circuit or process declares lock, indicating that a valid FM station has been discovered. On the other hand, the checks done on the 'image' check if it is an invalid FM channel. If determined invalid, the image frequency is added to the invalid station LUT, so that the particular frequency is subsequently skipped while scanning for a valid FM channel. If determined not-invalid, the image frequency becomes the new signal channel on a subsequent pass. In view of the teachings herein, other structure and process embodiments may readily be devised to handle signal and image in different ways, such as more nearly symmetric ways or otherwise, and also achieve at least some of the advantages described for FIG. 5 and other advantages.

Configuration for scanning up or scanning down is established in some embodiments in response to a user-listener input, such as a button-press, a touch screen entry, a voice command or other suitable input to request scan in a particular direction thereof. To support the parallel search strategy of FIG. 2 the Synthesizer 114 is tuned on the high side if configured for, and during, scanning in the forward direction by increasing the frequency $f_{LO}$ of synthesizer 114 in steps of 100 kHz. Synthesizer 114 is tuned on the low side instead if configured for, and during, scanning in the reverse direction by decreasing the frequency $f_{LO}$ of synthesizer 114 in steps of 100 kHz. Expressed in somewhat different words, synthesizer 114 is sequenced in frequency in a given direction of scan, and the Image output for example from down conversion 210 corresponds to a frequency more advanced in the direction of scan than does the channel frequency of the Signal output. Accordingly, the roles of these Image and Signal outputs from conversion 210 are reversed when scanning down compared to their roles when scanning up.

In FIG. 6, this role reversal operation is suitably performed by multiplexing anywhere along the signal paths of FIG. 6 in response to a selector signal designated Mode=Up/Down or the designation can mean Mode=Image output/Signal Output. Mux 260 is situated, without limitation, at the one particular illustrated location in the flow by way of example and performs this role-reversing function of establishing which signal path is to be FM demodulated by circuit 280. Also, Mux 260 is useful during scan even in one same given direction for switching one or the other Signal or Image channel to FM demodulation and Noise meter and downstream IF Count of FIG. 2. Software determines which way quality indicators IQI, SQI correspond to image and signal or vice versa. Another example instead uses multiplexing 260' (not shown) to reverse the outputs directly out of down conversion 210, and CSF Stage2 (250) goes directly to FM demodulation 280 with mux 260 omitted. FM demodulation 280 or FM discriminator functionality is performed by a CORDIC and difference filter block, followed by the blocks downstream therefrom. (CORDIC means COordinate Rotation DIgital Computation and generates values of trig functions without a multiplier and by using only add/subtract, shift and its own lookup table LUT.)

Some embodiments provide an automatically configured scan that uses a somewhat-modified process compared to that of FIG. 5. For example, such embodiments can automatically run such a scan on power up and/or log-in. A scan process for the automatic run suitably modifies step 140 so that the frequency is incremented or decremented relative to the current channel frequency by some adjustment number ΔN of channels, which may be determined as in FIG. 5 or otherwise. The next channel on an increasing (+) scan is expressed for instance as $(N+\Delta N)_{modM}$, i.e. modulo the number M of channels in the band to be scanned. (For example, the 87.5-108 FM broadcast band has M=206=(108−87.4)/0.1 channels to be scanned.) The direction of scan may be reversed on user command and/or automatically reversed depending on embodiment. The looping process then finds the channel numbers or frequencies of all of the valid stations and enters them in a LUT or set of records in a storage area of sufficient capacity to hold the information. In ordinary use of the receiver thereafter, the user can input a request for down-scan or up-scan and the receiver process straightforwardly consults the storage to ascertain the channel number or frequency of the nearest station in that direction and sets the synthesizer frequency for reception of that station.

The sequence of tuned synthesizer frequencies during an example of the parallel search strategy, in the absence of any valid FM stations, is indirectly illustrated in FIG. 3 by the resulting sequence 1, 2, 3 of pairs (signal band, image band). In FIG. 5, step 135 stores the subsequent channels that are identified as invalid in the LUT. The LUT contents are reset at BEGIN 105 at the start of every new autonomous scan. In one digital processing embodiment the parallel search strategy is executed, and along with that the SQI (Signal Quality Index) in the signal band and the IQI (Image Quality Index) in the image band are measured sequentially. Such processing, for one numerical example, may consume about 1 ms for every tune, i.e. about one millisecond of the processing associated with and supporting every operation that changes the synthesizer 114 frequency by a channel spacing, e.g. 100 kHz. Alternatively in some embodiments, additional digital hardware is provided to simultaneously or concurrently measure RSSI for SQI in the signal band and the RSSI for IQI in the image band.

A further type of embodiment is arranged with a LUT in connection with the Declare Lock step 190. When a Lock to a valid station is established at step 190, the channel frequency (or index N thereto) is stored in the LUT. Moreover, the process may be further elaborated by providing an additional outer scanning loop from Stop 195 back to BEGIN 105 to continue scanning just after a latest valid station so that the scanning process loads the LUT with the frequencies of all valid stations. Different embodiments of this latter type can employ the LUT at step 190 to hold the frequencies of all valid stations, or instead include the LUT of sufficient capacity with step 135 of this type of embodiment to store the frequencies of all invalid channels, and the process logic is arranged to accommodate such positive or negative LUT storage strategies either way.

Still other embodiments or modes do the elaborated frequency scan as described but may search over less than all of the FM band until the search finds an FM station, if any, having at least some specified amount higher signal quality and sending the same program as indicated by RDS/RBDS for some currently selected station. An RDS/RBDS comparison for a match is included in the additional outer scanning loop in such embodiment. The entire FM band may be searched, and an FM station having the highest signal quality and sending the same program can be selected in a related embodiment. Another type of embodiment or mode therein can search the frequency band for a particular type of program content or subject matter as indicated by the RDS/RBDS or other data signal without having some currently selected station already. In this way, fast scanning structure and processes search the band as in FIG. 5 with dramatically greater swiftness and also choose among valid stations for one or more of them that meet selection criteria under a given search mode. Relevant RDS/RBDS search data on FIG. 2 path 295 can be electronically determined at step 155 as another secondary metric. Then step 160 can determine a search status of non-match (non-hit) OR-ed with the thresholded Noise Meter in FIG. 5 to determine the invalidity for signal at step 160 and then sequentially determine similarly for the image at step 165 in case step 165 is reached.

In FIG. 5 as shown, the FM band scan time (when no signal is present) with the remarkable parallel search strategy is reduced by about half to e.g. 2.5 seconds given 100 KHz spacing in one example embodiment, down from twice that without such embodiment of structure and process. Also, another example embodiment, given 50 KHz channel spacing, reduces FM band scan time by about half to 5 seconds (when no signal is present) using parallel search, compared to about 10 seconds without the latter embodiment.

In FIG. 6, a Mode multiplexer (mux) 260 selects the Signal or the Image so that the state machine flow steps of FIG. 5 can process them one at a time. In one kind of embodiment, the mode MUX selects the 'Image' while checking if the 'IF_Count_Img' is invalid or while measuring the noise meter in the 'Image Band'. This can vary a little depending on the specific implementation (e.g., presence/absence of parallel hardware for measuring RSSI for the image band or signal band).

The state machine of FIG. 5 establishes the Mode as Signal or Image depending on what a FIG. 5 flow step calls for. Thus, the Mode select value depends on the specific state in the FIG. 5 flow.

In FIG. 6, a Channel Select Filter CSF 240, 250 selects (passes) the signal within the signal band of interest (i.e., single FM channel), after the down-conversion 210 of the low IF signal to DC. Basically, the filter is any suitable type of low pass or other filter (e.g., as in FIG. 7) that selects only the band lying in the filter passband. Blocker signals (e.g., adjacent band, image band, etc) that are present outside of the band of interest are desirably rejected by this filter. In one example, a digital FIR LPF (finite impulse response low-pass filter) is employed with a bandwidth of approximately 100 KHz (real filter with a pass band from 0 KHz to 100 KHz).

In FIG. 6, the image select filter ISF module 220, 230 isolates the image band and suppresses the signal band. The image signal strength is calculated by an image quality indicator IQI module 275 that enables the image select filter ISF to operate periodically (smart power management) to provide the image for IQI 275 to estimate the image strength IQI.

Once the image strength IQI is estimated and if the image strength is below a threshold, a power control block 320 disables the image select filter ISF stages 220, 230 to save and reduce power consumption after scanning or whenever not needed during scanning. The Image Select Filter ISF selects (passes) the signal in the image band (i.e., single FM image band), after the down-conversion of the low IF signal to DC. Its bandwidth is suitably identical to that of the channel select filter, e.g., digital FIR LPF real filter with a pass band from 0 KHz to 100 KHz, and in one example of FIG. 7 without limitation implemented as a two stage filter with decimation by a factor of 2. CSF and ISF are thus two parallel filters that operate on two different input signals Signal and Image as the scan proceeds.

In FIG. 7, among various possible implementations, and without limitation, an example of this FIR LPF uses a two stage filter that performs decimation by a factor of 2. Output from the digital down conversion block 210 in FIG. 2 and FIG. 6 arrives at a sample rate of 768 kHz for filtering. A first stage of the filter has 10 taps and decimates by two, thereby delivering an intermediate output at 384 kHz (kilosamples per second kSps).

Figure 8:
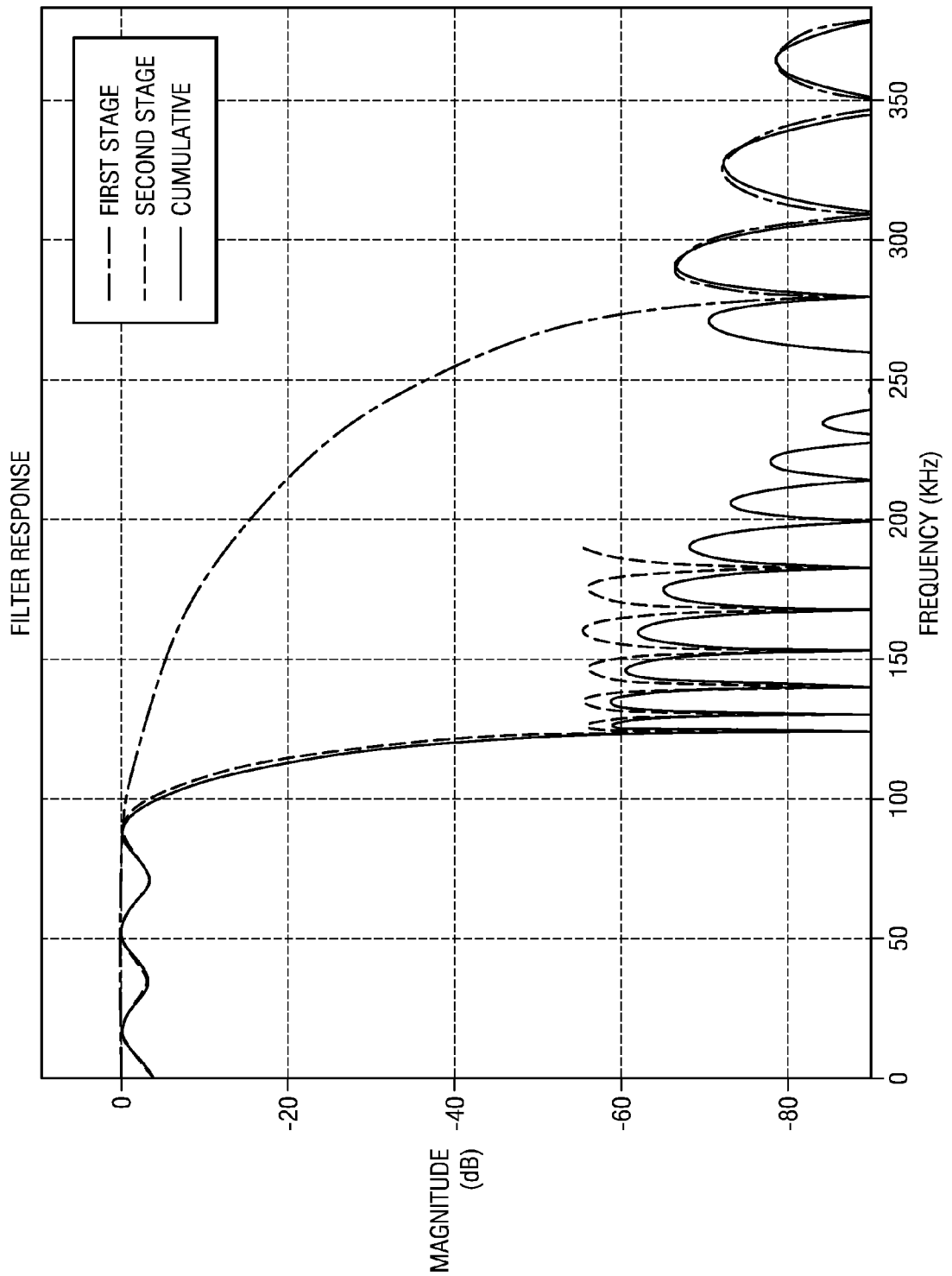
FIG. 8 is a filter response diagram showing superimposed plots of filter response magnitude (dB) versus frequency (KHz) for the first and second stage filtering of FIG. 7.

In FIG. 8, this first stage has a filter response as shown by the curve that gently rolls off between about 150 and 250 kHz. A second stage of the filter of FIG. 7 has 25 taps and delivers an overall filter output at 384 kHz (kSps). In FIG. 8, this second stage rolls off between 100 and 150 kHz. Overall, the two-stage filter delivers a low pass filter characteristic that rolls off fairly steeply at about 100 kHz and thereby nicely encompasses a particular channel to be captured by the filter. ISF in one implementation uses an input sampling rate of 768 kHz, 16-bit input and output bit precisions, signal band of 0-100 kHz and stop band 200-384 kHz with greater than 64 dB mean stop band attenuation that rejects the band at +/−300 KHz away.

Figure 9:
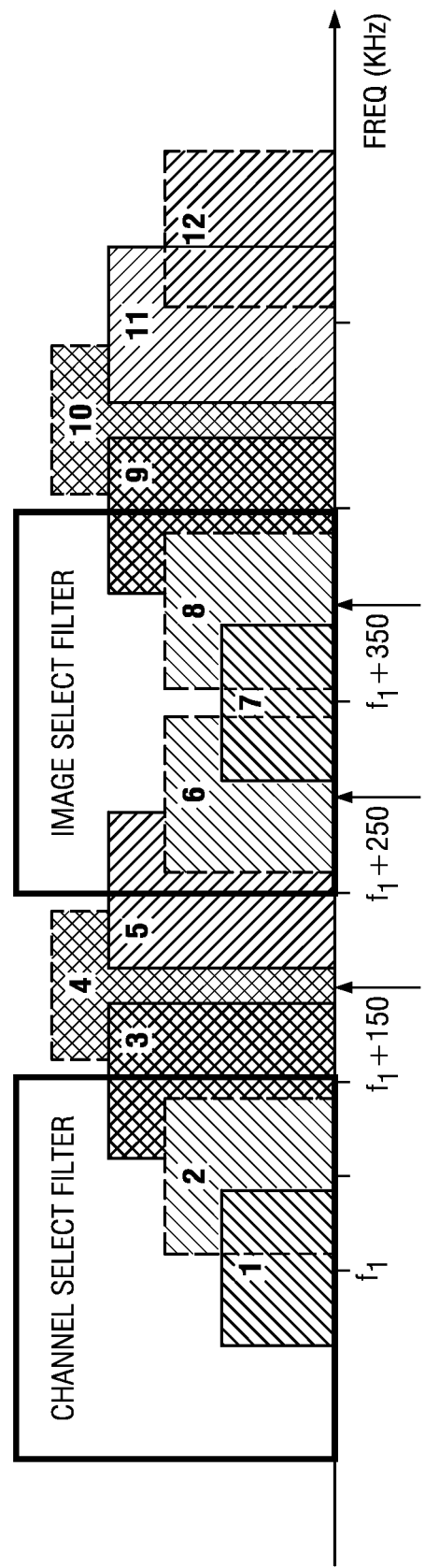
FIG. 9 is a frequency diagram of signal bands and image bands representing an alternative process embodiment for rapid scan of 50 KHz channels with decreased band scan time and related to FIGS. 5 and 6, and with pass bands of a Channel Select Filter and an Image Select Filter superimposed on the diagram.

In FIG. 9, a next embodiment executes an even more intensive parallel search strategy that provides even higher (4×) fourfold enhancement using a further important feature. When performing an autonomous scan for a 50 KHz raster, the use of channel select filters with 100 KHz bandwidth is further leveraged. Absence of FM transmission in channels that have an offset of 50 KHz from the signal and image bands can be determined, which confers a factor of 4× reduction in FM band scan time. If SQI/IQI RSSI in the signal and image bands are less than the threshold, then the channels centered at fc, fc+50 KHz, fc+250 KHz, fc+300 KHz, fc+350 KHz can all be declared as invalid. Providing such circuitry and executing such process reduces the FM band scan time fourfold to about 2.5 seconds in one frequency scanning example.

To enable the 4× parallel search embodiment, a cyclic buffer, e.g. of size 12, is used to maintain the list of subsequent invalid stations as shown in TABLE 2. A sequence of tuned synthesizer 114 frequencies for the 50 KHz band scan, in the absence of any valid FM stations, is illustrated next. For simplicity, entry of multiple entries of the same invalid station in the LUT is not precluded. Due to maintenance of the invalid station LUT, tuning the synthesizer 114 frequency $f_{LO}$ to frequencies like 87.7, 87.8, 87.9, 87.95, 88, 88.05, 88.1, 88.15, 88.2 is avoided. In this particular example, and like FIG. 5A, the synthesizer 114 under control of processor 80 does three single-steps of 100 KHz each, and then jumps over three such steps, etc. Compared to 100 KHz channels of FIG. 3, FIG. 9 the signal bandwidth is still the same. However, the center frequency of the channel can lie at a 50 KHz frequency raster. FIG. 9 shows the channels to be narrower for illustrative purposes and to make it easier for the reader to distinguish the various center frequencies. These channels are of the same width as those in FIG. 3. The Invalid Station LUT is set up to store more channel frequencies, or indices representing them. As shown, the LUT gets four (4) new entries on each loop pass. In TABLE 2, fourth row, the process starts anew entering four entries cyclically in the manner of a circular buffer.

TABLE 2

LUT FOR 4X PARALLEL SEARCH

| Signal Band (MHz) | Synthesizer Freq (MHz) | Image Band (MHz) | Invalid Station LUT |
|---|---|---|---|
| 87.5 | 87.65 | 87.8 | {87.55, 87.75, 87.8, 87.85, 0, 0, 0, 0, 0, 0, 0, 0,} |
| 87.6 | 87.75 | 87.9 | {87.55, 87.75, 87.8, 87.85, 87.65, 87.85, 87.9, 87.95, 0, 0, 0, 0,} |
| 87.7 | 87.85 | 88.0 | {87.55, 87.75, 87.8, 87.85, 87.65, 87.85, 87.9, 87.95, 87.75, 87.95, 88, 88.05} |
| 88.1 | 88.25 | 88.4 | {88.15, 88.35, 88.4, 88.45, 87.65, 87.85, 87.9, 87.95, 87.75, 87.95, 88, 88.05} |

Different embodiments for 4× scan can use the arrangements of either FIG. 6, or otherwise and with suitable software adapted from FIG. 5 to operate in the way shown FIG. 9 and TABLE 2.

Returning to FIGS. 4 and 5, parallel search strategy with Noise Meter recognizes that the 2× and 4× search strategies described herein can reduce band scan time as long as the RSSI threshold used during scan is above the noise floor. Under realistic scenarios the noise level depends on the antenna placement and orientation and hence could exceed the RSSI threshold. In that case, the absence of a valid station in the image (and adjacent bands) cannot be determined purely from the RSSI metric. Supplementary metrics like the noise meter, that estimates the noise level of the demodulated MPX signal, are used to avoid false locks under this scenario that might impede the 2×/4× search strategies described herein. Additionally, computing the noise meter metric may consume about 5.33 ms/channel, for instance, adding about 1 sec to conventional FM band scan time of 5 seconds (100 KHz channel raster) or 10 seconds (50 KHz). Adding the 1 sec for noise meter, the band scan times for the 100 KHz and 50 KHz channel raster are then slightly increased.

In FIG. 5, to solve the above consideration with parallel search and noise meter, a still further important improvement is made, as described next. Here, the noise meter module 290 (see FIG. 6), at the output of the FM demodulator 280 is used sequentially to measure the noise level in the signal and image bands. In FIG. 5, the 2× parallel search process incorporates noise meter for the image band at step 165. This sequential use of noise meter module enables determination of absence of a valid FM transmission in the image band. This measurement is performed only if RSSI exceeds the threshold at step 120. The advantages of the 2× parallel search strategy are preserved with a quite-acceptable, small (e.g., 0.5 sec) increment in FM band scan time due to noise meter computation for the image band.

FM band scan time (when no signal is present) with the just-described modification to the parallel search strategy, when RSSI threshold is set below noise floor, is tabulated in TABLE 3. 4× embodiments (like FIG. 9) can provide further improvements.

TABLE 3

ESTIMATED SCAN TIMES OVER AN ENTIRE EMPTY FM BAND

| Specification | Embodiment | |
|---|---|---|
| FM Band Scan Time (100 KHz spacing) | ~6 seconds | ~3.5 seconds |
| FM Band Scan Time (50 KHz spacing) | ~12 seconds | ~7 seconds |

Some embodiments thus provide a parallel search circuit and process that leverages low-IF receiver blocks of FIG. 2 to simultaneously identify an absence of valid FM transmission in both the signal and image bands during autonomous scan over a 100 KHz channel raster. A 2× reduction in autonomous scan time for FM reception remarkably results, compared to no parallel search.

In FIG. 9, some additional embodiments have circuitry and operation during autonomous scan over a given channel raster to simultaneously identify an absence of valid FM transmission in channels that are adjacent to the signal and image bands. The scanning process of FIG. 5 is suitably modified to index a number C of channels (e.g. I=0, 1, etc.) in the filter frequency window and run the steps 110, 115, 120, 155, 160 in a loop to test each of the channels and images singly or in combination for validity. Some embodiments check multiple channels in tandem or multiple images in tandem as they come through a CSF or ISF bandpass respectively. If none of the channels is valid, the frequency is adjusted by four frequency steps in the configured direction of scan and the loop is rerun with appropriate jumping as discussed for FIG. 5. A valid channel found by the loop is stored to the LUT. Variations of such embodiments are suitably provided as described in connection with FIG. 6 and otherwise for more or fewer channels, positive and negative storage in the LUT, various amounts of symmetry in the channel evaluation processes, process logic rearrangements, etc.

Figure 10:
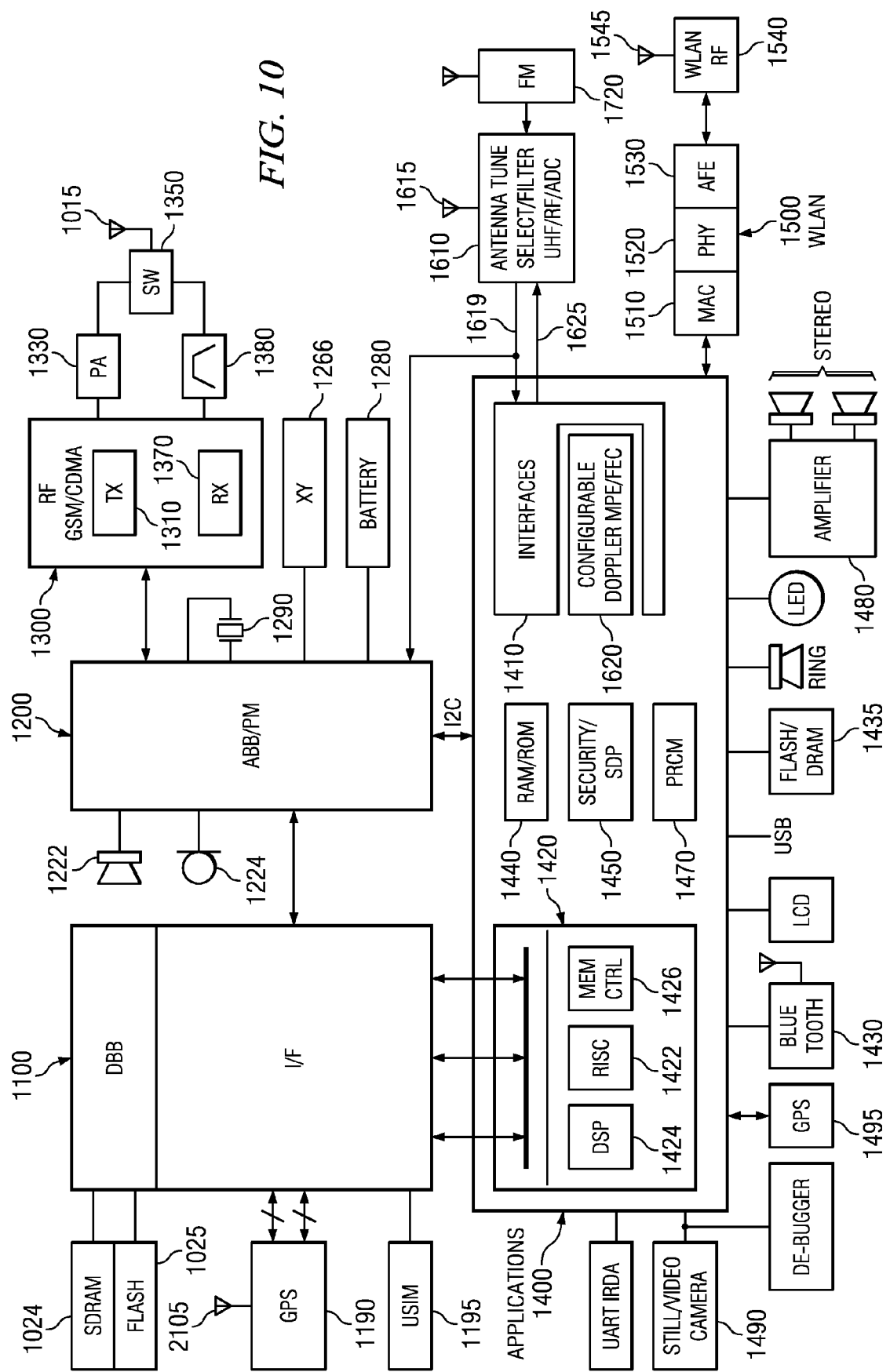
FIG. 10 is a block diagram of a system, or a SOC IC (system-on-a-chip integrated circuit), embodiment with circuits and processes as shown in any of the other Figures.

A system embodiment is provided in a single-chip FM+WLAN+BT+GPS transceiver, for example, such as in FIG. 10.

In FIG. 10, a system context suitably includes the FM receiver of FIGS. 1 and 2 and coexisting radios such as BT/WLAN, and is depicted by way of example and not of limitation. It is contemplated that the skilled worker uses each of the integrated circuits shown in FIG. 10, or such selection from the complement of blocks therein provided into appropriate other integrated circuit modules, or provided into one single integrated circuit module, in a manner optimally combined or partitioned between the modules, to the extent needed by any of the combo SOCs, cellular telephones, radios and televisions, set top boxes, Internet audio/video content players, fixed and portable entertainment units, WLAN gateways, routers, pagers, personal digital assistants (PDA), tablets, organizers, scanners, faxes, copiers, household appliances, office appliances, microcontrollers coupled to controlled mechanisms for fixed, mobile, personal, robotic and/or automotive use, combinations thereof, and other application products now known or hereafter devised for increased, partitioned or selectively determinable advantages. For some background on system on chip technologies, see U.S. Patent Application Publication 20080307240 (TI-60478) "Power Management Electronic Circuits, Systems, and Methods and Processes of Manufacture," which is incorporated herein by reference in its entirety.

In FIG. 10, a cell phone modem 1100, 1200, 1300 is suitably interfaced with an applications processor 1400 and various radios for WLAN 1500, Bluetooth 1430, GPS 1495, FM 1720 (or 10 in FIG. 1), and others. Applications processor 1400, for example, can include a RISC processor 1422 (such as MIPS core(s), ARM core(s), or other suitable processor), a digital signal processor (DSP) 1424 such as from the TMS320C55x™ DSP generation and/or the TMS320C6x™ DSP generation from Texas Instruments Incorporated or other digital signal processor(s), and a shared memory controller 1426 with DMA (direct memory access), and a graphic accelerator for a 2D or 3D (two/three-dimensional display) 1266. The RISC processor 1422 and the DSP 1424 suitably have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On-chip RAM/ROM 1440 provides on-chip storage, and interfaces 1410 couple the processors 1422 and 1424 to the off chip peripherals. A USIM (universal subscriber identification module) 1195 is coupled with an interface portion of DBB/IF 1100.

In FIG. 10, circuitry for digital baseband DBB/IF 1100, analog baseband/power management ABB/PM 1200, and RF TX/RX 1300 supports and provides wireless modem interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service HSDPA/HSUPA (High Speed Downlink Packet Access, High Speed Uplink Packet Access) (or 1xEV-DV, 1xEV-DO or 3xEV-DV), via an analog baseband chip and GSM/CDMA transmit/receive chip (in cell modem). SDRAM 1024 and flash memory 1025 suitably provide memory support for DBB/IF 1100. FIG. 10 provides a representative detail of parts of RF TX/RX for any of the wireless modems such as RF TX/RX 1310/1370, WLAN RF 1540, Bluetooth 1430, and others. A switchplexer or circulator 1350 couples RF power amplifier 1330 and RX 1370 with bandpass filter 1360 to a cell phone antenna 1015.

An audio/voice block in ABB/PM 1200 is suitably provided to support audio and voice functions and interfacing. A microphone 1224 and an audio output transducer 1222 are coupled with ABB/PM 1200. Speech/voice codec(s) and speech recognition are suitably provided in memory space in an audio/voice block in ABB/PM 1200 for processing. Applications processor 1400 in some embodiments is coupled to location-determining circuitry for satellite positioning such as GPS (Global Positioning System) 1190 or 1495 and/or to a network-based positioning (triangulation) system, to an accelerometer, to a tilt sensor, and/or other peripherals to support positioning, position-based applications, user realtime kinematics-based applications, and other such applications.

ABB/PM 1200 includes a power conversion block, power save mode control, and oscillator circuitry based on crystal 1290 for clocking the cores. A display 1266 is provided off-chip. Batteries 1280 such as a lithium-ion battery provide power to the system and battery data.

Further in FIG. 10, chip (or core) 1400 interfaces to high-speed WLAN 802.11a/b/g/n (Wi-Fi) MAC (media access controller) 1510, PHY 1520, AFE 1530, WLAN RF 1540 and a WLAN antenna 1545. Other data wireless interfaces are suitably provided for coe-existing IEEE 802.15 (Bluetooth and low and high rate piconet, Zigbee, and personal network communications) wireless circuit. Other interfaces suitably include a MCSI voice interface, a UART interface for controls and data to position unit GPS and otherwise, and a multi-channel buffered serial port (McBSP) for data. FM radio 10 of FIGS. 1 and 2 has a front end 1720 that is coupled with a DVB front end 1810, and they are together coupled with ABB/PM mixed signal chip 1200 and/or applications processor 1400 by control line 1625 and input lines 1619. A configurable Doppler MPE/FEC circuit 1620 supports the DVB. Further in peripherals, a MicroWire (u-wire 4 channel serial port), and USB, and a multi-channel buffered serial port (McBSP) to Audio codec, a touch-screen controller, and audio amplifier 1480 to stereo speakers. External audio content and touch screen (in/out) and LCD (liquid crystal display), organic semiconductor display, and DLP™ digital light processor display from Texas Instruments Incorporated, are suitably provided in various embodiments and coupled to interface of core 1400 for fixed, portable, mobile and/or vehicular use. An interface provides EMT9 and Camera interfacing to one or more off-chip still cameras or video cameras 1490, and/or to a CMOS sensor of radiant energy. PRCM 1470 (power, resets and control module) provides power management.

In FIG. 10, in some embodiments, GPS 1495 operates in close coordination with any one, some, or all of WLAN, WiMax, DVB (digital video broadcasting), or other network, to provide positioning, position-based, and user real-time kinematics applications. Still other additional wireless interfaces such as for wideband wireless such as IEEE 802.16 WiMAX mesh networking and other standards are suitably provided and coupled to the applications processor integrated circuit and other processors in the system.

Various production-testable and/or field-testable system embodiments with one or more SOCs are provided on a printed circuit board (PCB), a printed wiring board (PWB), and/or in an integrated circuit on a semiconductor substrate.

Structures and processes described herein confer enhanced FM or other receiver performance, such as for FM or other transceiver cores in multi-radio or combo devices. Such enhanced performance enhances the user experience and can benefit a large proportion of users due to the increasingly high penetration of FM into mobile consumer electronics devices.

Returning to FIG. 2, a non-limiting example of the output of the I/Q ADCs of FIG. 1 is at a rate of approximately 160 MSps. Any of various multiples of 32 KHz are conveniently used. This is decimated in FIG. 2, e.g. by a factor of 13 for AGC and RSSI for controls for the radio of FIG. 1. Further decimation, e.g. by 16, takes the data rate down to 768 KHz for further processing at low-IF as shown. The CSF/ISF LPFs cut the rate to 384 KHz to the FM demodulator and SQI and IQI, and a MPX LPF divides by two to deliver 192 KHz to remaining blocks downstream. The various rates are selected to accommodate the desired signal processing results and economy of implementation.

Also in FIG. 2, a non-limiting example of a complex digital de-rotator 210, also called a down-converter, has an associated programmable trigonometric SIN and COS generator that supplies values of sine and cosine for the de-rotator 210. The de-rotation is respectively followed by respective low pass filters CSF and ISF to respectively pass the channels for Signal and Image for measurements and scanning. Multiplexing 260 in FIG. 6 selects one or the other (of channel signal or image) for FM demodulation and noise meter. Subsequent to scanning, and in regular reception, the Signal path in FIG. 6 is fed through to ultimate stereo decoding, etc., downstream. The input of the down-converter 210 is complex and the output of the down-converter is also complex for both the signal and image components as in Equations (1-Sig_I and _Q) and (1-Img_I and _Q). The output becomes real at the output of the FM demodulator. Circuits or processing software with summers and multipliers straightforwardly implement the electronic operations represented by Equations (1-Sig_I and _Q) and (1-Img_I and _Q).

Notice the instances of dimensionless ratios of the form $f/F_{samp}$ in Equations (1-Sig), (1-Img) and (3-Sig), (3-Img). Such ratio $f/F_{samp}$ is the fraction of a unit circle in which the 'sampling' of the unit circle successively occurs as indexed by index n for de-rotating the quadrature channels of the FM IF signal. Each sine or cosine trigonometric argument is the latest phase to the SIN and COS generator, with subscripted frequency f or $f_{IF}$ as a parameter. $F_{samp}$ in the ratio is the rate of 'sampling' or accessing values from the SIN and COS LUT(s) for de-rotation and is suitably about the same as or higher than the sampling rate Fsamp such as 768 KHz input to the down-converter 210 in FIG. 2.

IQ de-rotation 210 of FIG. 6 eliminates a potential image in the CSF LPF filter passband through which the channel signal passes. The image is displaced 300 KHz=2*$f_{IF}$ as in FIG. 3 and is rejected by the CSF LPF. Analogously, for isolating the Image for output, IQ de-rotation 210 outputs the image at low frequency and thus in the ISF passband at the Image output of de-rotation 210. At that Image output, de-rotation 210 eliminates the channel signal from lying in the ISF LPF filter passband. That channel signal instead is displaced 300 KHz=2*$f_{IF}$ and is rejected by the ISF LPF.

Think conceptually of separate de-rotation frequencies $f_{drS}$, $f_{drI}$ being applied to respectively convert signal and image to DC:

$$Sig_{out\_I}(n)=I_{in}(n)\cos(2\pi n f_{drS}/F_{samp})+Q_{in}(n)\sin(2\pi n\text{-}f_{drS}/F_{samp}) \quad (1\text{-Sig\_I})$$

$$Sig_{out\_Q}(n)=Q_{in}(n)\cos(2\pi n f_{drS}/F_{samp})-I_{in}(n)\sin(2\pi n\text{-}f_{drS}/F_{samp}) \quad (1\text{-Sig\_Q})$$

$$Img_{out\_I}(n)=I_{in}(n)\cos(2\pi n f_{drI}/F_{samp})+Q_{in}(n)\sin(2\pi n\text{-}f_{drI}/F_{samp}) \quad (1\text{-Img\_I})$$

$$Img_{out\_Q}(n)=Q_{in}(n)\cos(2\pi n f_{drI}/F_{samp})-I_{in}(n)\sin(2\pi n\text{-}f_{drI}/F_{samp}) \quad (1\text{-Img\_Q})$$

Notice that the structure of the complex digital derotation Equations (1-Sig) and (1-Img) down-converts at least one channel apiece into the LPF passband of CSF and ISF respectively. A way of thinking of this pictures the channels as represented by single tones therein at $I_{in}=\cos(2\pi n\, f_S/F_{samp})$ and $Q_{in}=\sin(2\pi n\, f_{Img}/F_{samp})$. Equations (1-Sig) and (1-Img) then represent a trig identity of frequency subtraction, and the frequencies for that subtraction are chosen to prevent confusion of the channel signal and the image which are spaced apart. Notice that no limitation is thereby placed on the choice of the derotation frequency or frequencies of various embodiments. An embodiment can capture one or more channels at specific distance apart and provide an appropriate arrangement of the process used in FIG. 5 and FIG. 6. The way that de-rotation 210 obtains these outputs is represented by Equations (1-Sig) and (1-Img), and a special case is more specifically laid out next after.

Let de-rotation frequencies for signal and image $f_{drS}$, $f_{drI}$ be set so that conversion of the image $f_{Iif}$ to DC occurs (i.e. $f_{Iif}-f_{drI}=0$), the other frequency difference ($f_{Sif}-f_{drI}$) is 300 KHz away and readily rejected by FIG. 6 LPF ISF.

$$[(f_{Sif}-f_{drS}),(f_{Iif}-f_{drS})]=[0,-300\text{ KHz}] \quad (2\text{-Sig})$$

$$[(f_{Sif}-f_{drI}),(f_{Iif}-f_{drI})]=[300\text{ KHz},0] \quad (2\text{-Img})$$

In one special case, let $f_{Sif}=-f_{Iif}$, so that the signal and image frequencies are of opposite signs. This means $f_{drS}=-f_{Iif}$ given down-conversion to DC for the Image output, i.e. $f_{Iif}-f_{drI}=0$, this means $f_{drS}=-f_{Iif}=-f_{drI}$. Since the image is at the IF by definition $f_{Iif}=f_{IF}$, then de-rotation $f_{drI}=f_{IF}$ in this case. Also, then signal de-rotation frequency $f_{drS}=-f_{IF}$, a negative frequency. In other words, a single de-rotation frequency is sufficient in the hardware in that type of an embodiment, and complex de-rotator 210 can be arranged quite elegantly and with low power consumption. The special case opposite-signed de-rotation frequencies are substituted into Equations (1-Sig) and (1-Img) and simplified, with the resulting electronic circuitry in block 210 represented by Equations (3-Sig) and (3-Img):

$$Sig_{out\_I}(n)=I_{in}(n)\cos(2\pi n f_{IF}/F_{samp})-Q_{in}(n)\sin(2\pi n f_{IF}/F_{samp}) \quad (3\text{-Sig\_I})$$

$$Sig_{out\_Q}(n)=Q_{in}(n)\cos(2\pi n f_{IF}/F_{samp})+I_{in}(n)\sin(2\pi n\text{-}f_{IF}/F_{samp}) \quad (3\text{-Sig\_Q})$$

$$Img_{out\_I}(n)=I_{in}(n)\cos(2\pi n f_{IF}/F_{samp})+Q_{in}(n)\sin(2\pi n f_{IF}/F_{samp}) \quad (3\text{-Img\_I})$$

$$Img_{out\_Q}(n)=Q_{in}(n)\cos(2\pi n f_{IF}/F_{samp})-I_{in}(n)\sin(2\pi n\text{-}f_{IF}/F_{samp}) \quad (3\text{-Img\_Q})$$

Notice that even in the special case, the number of versions of embodiments are feasible. Theoretically, a 100 KHz de-rotation frequency would be possible, to the extent that a clean filter separation can be accomplished when the channels are that wide in FIG. 4. Also, if single conversion from RF to 100 KHz is employed when the channels are that wide, the synthesizer frequency $f_{LO}$ might pose blocking problems on the edge of the channels. A 150 kHz de-rotation as illustrated for FIG. 3 conveniently locates synthesizer frequency $f_{LO}$ in the middle of an adjacent channel where blocking problems are less, and the 150 kHz de-rotation is compatible with subsequent low pass filtering CSF and ISF that can cleanly separate the signal and the image. In other embodiments of this type, low-IF de-rotation frequencies can also usefully be 200, 250, 300, or other greater-than-two multiple of at least 50 KHz, or such multiple of at least half a channel width.

In still another type of embodiment, the digital down-conversions or de-rotations are applied by the firmware de-rotator module 210 using a first de-rotation frequency $f_{drS}$ for down-converting the channel signal to baseband at the Signal output of de-rotator 210 and by separately parallel-executing the de-rotator module actually using a second de-rotation frequency $f_{drI}$ for down-converting the image signal to baseband at the Image output. The de-rotations are respectively followed by respective low pass filters CSF and ISF to respectively pass both the channel signal and image for measurements and scanning Multiplexing selects one or the other (of channel signal or image) for FM demodulation and noise meter. Subsequent to scanning, and in regular reception, only the de-rotation is executed that uses first de-rotation frequency $f_{drS}$ for down-converting the channel signal to baseband and stereo decoding. The input of the down-converter 210 is complex and the output is real for each of Signal and for Image as in Equations (1-Sig) and (1-Img).

Notice that the structure of the complex digital derotation Equations (1-Sig) and (1-Img) down-converts one channel apiece into the LPF passband of CSF and ISF respectively. That prevents confusion of the channel signal and the image which are spaced 2*$f_{IF}$ apart. Notice, however, that no limitation is thereby placed on the choice of the derotation frequencies $f_{drS}$ and $f_{drI}$. In other words, these two frequencies $f_{drS}$ and $f_{drI}$ for FIG. 4, as well as de-rotation frequencies that can support an embodiment as in FIG. 6, can be established one or more channels apart depending on the arrangement of the process used in FIG. 5. For example, some embodiments have $f_{drS}$ and $f_{drI}$ spaced one channel (100 kHz) apart for operation as in FIGS. 5-5D. Some other embodiments have $f_{drS}$ and $f_{drI}$ spaced two (2) channels apart (200 kHz), while still other embodiments have $f_{drS}$ and $f_{drI}$ spaced three (3) channels apart (300 kHz), or more.

Turning to the subject of power management, in FIG. 2, power management is intelligently accomplished during frequency scanning by omitting to execute the blocks such as stereo decoding and RDS downstream of the baseband section 200. Even inside the frequency scanning, various of the blocks of FIGS. 5 and 6 can be powered up according to need or powered down otherwise. Conversely, during regular reception, stereo decoding and RDS are activated, and power management disables or omits to execute the frequency scanning process and its associated measurement processes. These powered-down or disabled processes include the frequency scanning state machine logic of FIG. 5, the FIG. 2 image signal parallel de-rotation, IQI, ISF, noise meter and any other measurements used by the frequency scanning process that can be acceptably disabled during regular reception.

Some power managed circuit embodiments establish and utilize metrics as primary and secondary metrics for the inner and outer loop of FIG. 5 in a way that provides even further power management benefits. For example, in some alternative embodiments in which the receiver circuitry permits, IF_Count downstream of the demodulator is treated as a secondary metric and used at step 155, 160 and 165, instead of being included as a primary metric at steps 115, 120 and 130 as in FIG. 5. Then the power management circuitry disables the FM demodulator and all the downstream modules, including the noise meter and IF_Count, and enables the demodulator and relevant downstream modules if the signal channel is found to be valid at step 120 based on the criterion RSSI_Sig>Threshold, as a single primary metric.

Signal estimates RSSI for SQI and IQI are generated in any suitable manner, e.g.:

$$SQI = \sum_{nwindow} Sig^2(n) \qquad (4\text{-}SQI)$$

$$IQI = \sum_{nwindow} Img^2(n) \qquad (4\text{-}IQI)$$

Additionally, operations like $\log_2(SQI)$ can provide quantities proportional to dB if desired. FM modulated signals typically have a DC component.

In FIG. 2, a notch filter in the phase compensation path filters off symmetric spurs around DC to avoid spur-caused biased estimates of gain and phase imbalance.

The DC offsets block of FIG. 2 tracks average value I signal and average value Q signal and then revises the DAC-I and DAC-Q by a negative feedback loop to compensate or cancel slowly changing DC offsets for each I or Q channel in regular post-calibration receiver operation.

In FIG. 2, the I/Q Imbalance Estimation block adjusts the amplitude of the quadrature Q signal to match the amplitude of the in-phase I signal. The gain compensation accumulates the average squares of I and Q (with DC offset eliminated) and suitably applies gain compensation as a joint function of them. In one example, whichever is the signal I or Q for which the average square is less, that signal is multiplied by a gain factor $g_m$ equal to the square root of the ratio of the larger average square to the smaller average square.

The I/Q Imbalance Estimation block then adjusts the phases so they even more precisely differ by 90 degrees (quadrature). The electronic operations performed by the I/Q Imbalance Estimation block for compensating an IQ phase imbalance $-\delta$ (departure from 90 degrees) are represented, for instance, by:

$$Qout = \frac{Qin}{\cos(\delta)} + \tan(\delta)Iin \qquad (5)$$

wherein the phase imbalance estimation is continually measured prior to the compensation operations and the electronic estimation process is represented by:

$$\sin(-\delta) \sim = -G^*\text{Avg}[I^*Q]/\text{Avg}[I_{out}^2] \qquad (6)$$

Regarding processor 80, the circuitry and processes are operable with RISC (reduced instruction set computing), CISC (complex instruction set computing), DSP (digital signal processors), microcontrollers, PC (personal computer) main microprocessors, math coprocessors, VLIW (very long instruction word), SIMD (single instruction multiple data) and MIMD (multiple instruction multiple data) processors and coprocessors as cores or standalone integrated circuits, and in other integrated circuits and arrays. The compressed scan chain diagnostic circuitry is useful in other types of integrated circuits such as ASICs (application specific integrated circuits) and gate arrays and to all circuits with structures and analogous problems to which the advantages of the improvements described herein commend their use.

Some other embodiments recognize that the channels in the band may not all be equally spaced apart in frequency, such as in the case of TV channels or other non-uniform channels, so that some inapplicable images would be ignored. The IF for derotation is also suitably revised depending on channel width and distance between the signal band and image band. Depending on the modulation expected for reception, the post-demodulation measurements, if used, are suitably revised to appropriately detect signal and/or measure noise. Additionally, some channels and communications systems use spread-spectrum codes or other non-frequency-based types of channels. These codes can be associated with channel ID numbers directly or by an electronic look-up or mapping table. Using the teachings herein, further embodiments suitably scan through the channels using a controllable receiver by which the processor measures and evaluates reception in the channels of whatever type in pairs or larger numbers at a time in a sequence by which the process can at least sometimes jump over channels and save scanning time in the manner described herein.

Some further embodiments are addressed to a channel scanning problem for determining a controllable transmitter frequency to use in a frequency band or other channel band having numerous occupied channels and only a few available channels for the transmitter to use. In such case, the teachings herein are applied in reverse so that the invalid station recordkeeping is replaced instead with valid station recordkeeping. The receiver scans the signal and image channels and automatically enters channels with valid stations, for the frequency scan process to subsequently jump over and thereby save time to find an available, empty, or invalid channel for transmission. In FIG. 5, the threshold comparisons for such validity scanning are reversed so that tests for greater than (>) are replaced with tests for less than (<), and vice versa; and tests for validity are replaced with tests for invalidity and vice versa; or the tests are otherwise suitably modified for time-efficient and reliable scanning.

Various embodiments are applicable to systems regardless of physical layer interface used for reception, e.g., over-the-air terrestrial transmissions, satellite transmissions, cable/fiber-optic transmissions, etc.

In addition to inventive structures, devices, apparatus and systems, processes are represented and described using any and all of the block diagrams, logic diagrams, and flow diagrams herein. Block diagram blocks are used to represent both structures as understood by those of ordinary skill in the art as well as process steps and portions of process flows. Similarly, logic elements in the diagrams represent both electronic structures and process steps and portions of process flows. Flow diagram symbols herein represent process steps and portions of process flows in software and hardware embodiments as well as portions of structure in various embodiments of the invention.

ASPECTS

See Notes Paragraph at End of this Aspects Section

21A. The process claimed in claim 21 wherein the image channel is a channel that is three channels ahead of the current signal channel in the tuning direction, and said invalid-channel record has sufficient capacity to store as many as three indications of invalid channels.

21B. The process claimed in claim 21 wherein the image channel is a channel that is a particular number of channels ahead of the current signal channel in the tuning direction, and the process successively re-tunes through that number of signal channels, given they are empty of signal, in the order of the tuning direction, and can then jump in tuning by as many as that number of additional channels depending on entries in the invalid-channel record, whereby saving search time.

21C. The process claimed in claim 21 wherein the electronically measuring includes demodulating the signal channel and electronically deriving a value of the secondary metric from the demodulated signal channel.

21C1. The process claimed in claim 21C further comprising evaluating the signal channel relative to the measured secondary metric, and if the signal channel passes then terminating the search and continuing to demodulate the signal thus acquired.

21D. The process claimed in claim 21 further comprising, when a signal channel is reached that satisfies the criterion, branching to an outside loop to electronically measure and evaluate at least one secondary metric for the signal channel only, and if the evaluation fails then evaluating the secondary metric on the image channel as well and conditionally branching, depending on the evaluation of the image channel, to one of at least two places in the inside loop and proceeding.

21D1. The process claimed in claim 21D wherein if the image channel fails on the secondary metric, then the conditional branch goes to the record-keeping by adding the image frequency to an invalid channel record, but the image channel passes the secondary metric than the conditional branch goes to the adjusting instead.

21D2. The process claimed in claim 21D wherein in case the signal channel evaluation passes based on the secondary metric then making a separate validity-type record-keeping entry and continuing the search process in the tuning direction starting just after the latest valid signal channel so that the search process makes entries representing the signal channels having valid stations.

21E. The process claimed in claim 21 wherein the signal channel and image channel are handled in asymmetric ways such that checks on the signal channel are used to determine the presence of a valid channel and the checks done on the image channel check for the absence of a valid station.

21F. The process claimed in claim 21 wherein when the image frequency lacks a valid station, the image frequency is added to the invalid channel record, so that the particular frequency is subsequently skipped while scanning for a valid signal channel.

21G. The process claimed in claim 21 further comprising configuring the tuning direction in response to an input selected from the group consisting of: 1) button-press, 2) touch screen entry, 3) voice command.

21H. The process claimed in claim 21 further comprising role-reversing signal paths applicable to the process depending on the tuning direction.

21J. The process claimed in claim 21 further comprising operating a state machine to support the process.

21J1. The process claimed in claim 21J further comprising selecting the signal channel output or the image channel output, and the operating of the state machine includes processing the signal channel output or the image channel output one at a time.

21K. The process claimed in claim 21 further comprising at least once demodulating the signal channel output and the image channel output alternately to electronically measure a secondary metric for the signal channel and the image channel respectively.

21L. The process claimed in claim 21 for use with channels with a nominal channel width, wherein the delivering includes de-rotating a signal channel and an image channel to a signal output and to a separate image output, and filtering the signal output with a passband approximating the nominal channel width and filtering the image output with a passband approximating the nominal channel width thereby to provide a signal channel filter output substantially free of image channels and an image channel output substantially free of signal channels.

37A. The frequency scanning process claimed in claim 37 wherein the accessing of the storage includes operating the storage as a cyclic buffer.

37B. The frequency scanning process claimed in claim 37 further comprising then selectively testing each of the signal channels and image channels singly or in combination for validity.

37C. The frequency scanning process claimed in claim 37 further comprising, when that case is absent, selectively testing at least one of the channels in the current plurality of signal channels for validity.

37D. The frequency scanning process claimed in claim 37 further comprising, when that case is absent, selectively testing each of the channels in the plurality of image channels for validity and entering one or more identifiers representing the invalid image channels into the storage.

37E. The frequency scanning process claimed in claim 37 wherein the electronically entering includes, when that case is present, electronically entering into the storage three identifiers respectively representing the empty image channels.

37E1. The frequency scanning process claimed in claim 37E wherein the electronically entering includes, when that case is present, also electronically entering into the storage one identifier representing a signal channel in the filtered signal channel bandwidth situated in an advanced position in the tuning direction.

Notes about Aspects above: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

Processing circuitry comprehends digital, analog and mixed signal (digital/analog) integrated circuits, ASIC circuits, PALs, PLAs, decoders, memories, and programmable and nonprogrammable processors, microcontrollers and other circuitry. Internal and external couplings and connections can be ohmic, capacitive, inductive, photonic, and direct or indirect via intervening circuits or otherwise as desirable. Process diagrams herein are representative of flow diagrams for operations of any embodiments whether of hardware, software, or firmware, and processes of manufacture thereof. Flow diagrams and block diagrams are each interpretable as representing structure and/or process. While this invention has been described with reference to illustrative embodiments, this description is not to be construed in a limiting sense. Various modifications and combinations of the illustrative embodiments, as well as other embodiments of the invention may be made. The terms including, having, has, with, or variants thereof are used in the detailed description and/or the claims to denote non-exhaustive inclusion in a manner similar to the term comprising. The appended claims and their equivalents are intended to cover any such embodiments, modifications, and embodiments as fall within the scope of the invention.

What is claimed is:

1. A process of frequency scan for a wireless receiver, the process comprising:
   capturing an image band and a signal band in parallel, with the image band situated in advance of the signal band in a direction of scan;
   electronically evaluating the image signal band and channel signal band to determine whether each band is invalid or not,
   storing an identification of the image band when evaluated invalid; and
   advancing the frequency of capture until a latest signal band is reached corresponding to the stored identification of the invalid image band and then jumping over such band until a signal band to be captured no longer corresponds to a stored identification of an invalid image band.

2. The process claimed in claim 1 further comprising executing the evaluating using a primary metric in an inner loop, and using a secondary metric in a loop exterior to the inner loop, whereby reducing a probability of false detection.

3. The process claimed in claim 2 further comprising executing a noise meter module only exterior to the inner loop, whereby reducing process operations.

4. The process claimed in claim 3 further comprising using the noise meter module on the signal band, and if the signal band indicates invalid, proceeding sequentially to use the noise meter module on the image band.

5. The process claimed in claim 1 further comprising evaluating for absence of valid transmission in channel bands that are adjacent to the signal and image bands.

6. The process claimed in claim 1 further comprising cyclically buffering such stored identification of an invalid image band.

7. The process claimed in claim 1 further comprising continuing the advancing until a signal band is reached that has a not-invalid signal on a primary metric, and then electronically applying a secondary metric to detect presence of a valid signal.

8. The process claimed in claim 7 further comprising demodulating such valid signal using a demodulator of a type of modulation selected from the group consisting of: 1) frequency modulation FM, 2) phase modulation, 3) amplitude modulation AM, 4) double sideband, 5) single sideband, 6) combined modulation for television, 7) frequency division multiplex (FDM).

9. The process claimed in claim 1 further comprising using a tunable frequency synthesizer and downconverter for the capturing, the advancing also tuning the frequency synthesizer in the direction of scan.

10. The process claimed in claim 1 wherein the electronic evaluating selectively includes a noise meter evaluation for the signal band and if invalid, then a noise meter evaluation of the image band, all free of retuning of the frequency synthesizer, whereby to identify the absence of a valid signal and image transmission when the noise exceeds a threshold.

11. The process claimed in claim 1 further comprising executing the evaluating using at least one primary metric in an inner loop, and wherein the at least one primary metric is selected from the group consisting of: 1) RSSI for received signal band signal strength, 2) RSSI for received image signal strength, 2) IF Count (nominal center frequency of channel).

12. The process claimed in claim 11 further comprising executing the evaluating using at least one secondary metric in a loop exterior to the inner loop, and wherein the at least one secondary metric is selected from the group consisting of 1) a measure of the noise in the desired band, 2) a noise meter, 3) spur detection, 4) compression detection.

13. A wireless signal band searching process having a tuning direction and comprising:
   automatically tuning a receiver to a specified channel frequency to deliver a signal channel and an image channel separate from each other;
   electronically measuring at least one primary metric for the signal channel and electronically evaluating whether the signal channel has any signal that satisfies a criterion based on the at least one primary metric;
   when the signal channel fails such criterion, then branching to an inside loop to analogously evaluate the image channel relative to a similar criterion;
   when the image channel fails the similar criterion, then record-keeping by electronically entering an indication of the image frequency into an invalid-channel record;
   adjusting a channel frequency specifying value to re-specify a channel frequency in the tuning direction;
   accessing the invalid channel record based on the adjusted channel frequency specifying value to determine whether the re-specified channel frequency is indicated as an invalid channel, and if so, then electronically repeating the adjusting and accessing until such invalid channel indication is absent for a currently adjusted value; and
   then repeating two or more of the tuning, electronic measuring, electronic evaluating, record-keeping, adjusting, and accessing steps until a signal channel reached that satisfies the criterion.

14. The process claimed in claim 13 wherein the image channel is a channel that is a particular number of channels ahead of the current signal channel in the tuning direction, and when twice that number of consecutive channels lack signal beginning with the current signal channel, the process initially single-step retunes through that particular number of channels and then executes plural adjustments that result in a tuning jump on the next retuning, whereby saving search time.

15. The process claimed in claim 13 further comprising, when a signal channel is reached that satisfies the criterion, electronically measuring at least one secondary metric for the signal channel only, whereby to reduce a chance of false detection.

16. The process claimed in claim 13 further comprising, when a signal channel is reached that satisfies the criterion, branching to an outside loop to electronically measure and evaluate at least one secondary metric for the signal channel only, and if the evaluation fails then branching to the inside loop and proceeding.

17. The process claimed in claim 13 for use with channels with a nominal channel width, wherein the delivering includes de-rotating plural signal channels and plural image channels to a signal output and to a separate image output, and filtering the signal output with a passband at least twice the nominal channel width and filtering the image output with a passband at least twice the nominal channel width thereby to provide a signal filter output substantially free of image channels and an image filter output substantially free of signal channels; and wherein the measuring includes electronically measuring the signal filter output as a whole and also electronically measuring the image filter output as a whole to determine whether it is the case that both A) the plural signal channels together fail the criterion and B) the plural image channels together fail the criterion; and wherein the record-keeping includes, when that case is present, electronically entering one or more indications representing the plural image channels into the invalid-channel record.

18. The process claimed in claim 13 wherein the image channel is a channel that is three channels ahead of the current signal channel in the tuning direction, and said invalid-channel record has sufficient capacity to store as many as three indications of invalid channels.

19. The process claimed in claim 13 wherein the image channel is a channel that is a particular number of channels ahead of the current signal channel in the tuning direction, and the process successively re-tunes through that number of signal channels, given they are empty of signal, in the order of the tuning direction, and can then jump in tuning by as many as that number of additional channels depending on entries in the invalid-channel record, whereby saving search time.

20. The process claimed in claim 13 wherein the electronically measuring includes demodulating the signal channel and electronically deriving a value of the secondary metric from the demodulated signal channel.

21. The process claimed in claim 20 further comprising evaluating the signal channel relative to the measured secondary metric, and if the signal channel passes then terminating the search and continuing to demodulate the signal thus acquired.

22. The process claimed in claim 13 further comprising, when a signal channel is reached that satisfies the criterion, branching to an outside loop to electronically measure and evaluate at least one secondary metric for the signal channel only, and if the evaluation fails then evaluating the secondary metric on the image channel as well and conditionally branching, depending on the evaluation of the image channel, to one of at least two places in the inside loop and proceeding.

23. The process claimed in claim 22 wherein if the image channel fails on the secondary metric, then the conditional branch goes to the record-keeping by adding the image frequency to an invalid channel record, but the image channel passes the secondary metric than the conditional branch goes to the adjusting instead.

24. The process claimed in claim 22 wherein in case the signal channel evaluation passes based on the secondary metric then making a separate validity-type record-keeping entry and continuing the search process in the tuning direction starting just after the latest valid signal channel so that the search process makes entries representing the signal channels having valid stations.

25. The process claimed in claim 13 wherein the signal channel and image channel are handled in asymmetric ways such that checks on the signal channel are used to determine the presence of a valid channel and the checks done on the image channel check for the absence of a valid station.

26. The process claimed in claim 13 wherein when the image frequency lacks a valid station, the image frequency is added to the invalid channel record, so that the particular frequency is subsequently skipped while scanning for a valid signal channel.

27. The process claimed in claim 13 further comprising configuring the tuning direction in response to an input selected from the group consisting of: 1) button-press, 2) touch screen entry, 3) voice command.

28. The process claimed in claim 13 further comprising role-reversing signal paths applicable to the process depending on the tuning direction.

29. The process claimed in claim 13 further comprising operating a state machine to support the process.

30. The process claimed in claim 29 further comprising selecting the signal channel output or the image channel output, and the operating of the state machine includes processing the signal channel output or the image channel output one at a time.

31. The process claimed in claim 13 further comprising at least once demodulating the signal channel output and the image channel output alternately to electronically measure a secondary metric for the signal channel and the image channel respectively.

32. The process claimed in claim 13 for use with channels with a nominal channel width, wherein the delivering includes de-rotating a signal channel and an image channel to a signal output and to a separate image output, and filtering the signal output with a passband approximating the nominal channel width and filtering the image output with a passband approximating the nominal channel width thereby to provide a signal channel filter output substantially free of image channels and an image channel output substantially free of signal channels.

33. A power managed circuit comprising:
a de-rotation circuit having a signal channel output and a separate image channel output;
a first low pass filter and a second low pass filter connected to said signal channel output and said image channel output respectively;
a signal strength module coupled for measuring respective signal strengths from said first low pass filter and from said second low pass filter; and
a power management circuit operable for frequency scanning based at least in part on said signal strength module and further operable to selectively enable and disable the first low pass filter and said second low pass filter alternately during the frequency scanning and to disable said second low pass filter after such frequency scanning is completed.

34. The power managed circuit claimed in claim 33 wherein said signal strength module has a signal channel indicator circuit and an image channel indicator circuit, and said power management circuit is additionally operable to alternately enable and disable the signal channel indicator circuit while alternately disabling and enabling the image channel indicator circuit.

35. The power managed circuit claimed in claim 33 further comprising a noise meter, said power management circuit operable to selectively enable and disable said noise meter during frequency scanning.

36. The power managed circuit claimed in claim 35 wherein said power management circuit is also operable during frequency scanning to enable the noise meter when the signal strength module indicates substantial signal strength from said first low pass filter and otherwise to disable the noise meter.

37. The power managed circuit claimed in claim 33 further comprising a demodulator, said power management circuit operable to selectively enable and disable the demodulator during frequency scanning.

38. The power managed circuit claimed in claim 37 further comprising an electronic measurement circuit fed by said demodulator, said power management circuit additionally operable to selectively enable and disable said electronic measurement circuit along with said demodulator.

39. An integrated circuit system comprising:
a receiver tunably operable to receive signal channels;
at least one coexisting radio; and
a processor operable to control the at least one coexisting radio, and further to control the receiver in a channel scanning mode that concurrently receives multiple channels and that retunes the receiver based on invalid-channel information derived from the receiver in the multiple channels to at least sometimes jump by plural channels in the frequency scanning mode;
wherein said processor is operable to execute a low intermediate frequency de-rotator with signal band and image band outputs, and to parallelize a frequency scan for the channel scanning mode according to instances of absence of transmission in both the signal band and the image band outputs; and
wherein the frequency scan is over a frequency raster that has a spacing, and said processor includes a cyclic buffer supporting such channel scanning mode and having a capacity for invalid-channel indications at least equal in number to a ratio of twice the low intermediate frequency divided by the spacing of the frequency raster.

40. The integrated circuit system claimed in claim 39 wherein the low intermediate frequency de-rotator has a de-rotation frequency that is a greater-than-two multiple of at least half a channel width.

41. The integrated circuit system claimed in claim 39 wherein said at least one coexisting radio is coupled to said processor for at least one operation selected from the group consisting of: 1) cellular telephone, 2) internet content player, 3) tablet, 4) satellite positioning.

42. A frequency scanning process having a tuning direction and for scanning a band of channels having a nominal channel width, the process comprising:
tuning a wireless receiver based on specified channel frequency to receive plural signal channels and plural image channels;
de-rotating the plural signal channels and plural image channels to a signal output and to a separate image output;
filtering the signal output with a passband at least twice the nominal channel width and filtering the image output with a passband at least twice the nominal channel width thereby to provide a signal filter output substantially free of image channels and an image output substantially free of signal channels;
electronically measuring the signal filter output as a whole to determine whether it is the case that both A) the plural signal channels are substantially empty of valid signals and B) the plural image channels are substantially empty of valid signals;
when that case is present, electronically entering into a storage one or more identifiers representing the plural image channels; and
adjusting a channel frequency specification value to represent a re-specified channel frequency in the tuning direction;
accessing the storage to determine whether the re-specified channel frequency is indicated as an invalid channel, and if so, then repeating the adjusting and accessing until such indication is absent; and
then repeating to retune in the tuning direction based on the respecified channel frequency, and perform the electronic measuring and evaluating, adjusting and accessing steps until a set of signal channels is reached that has that least one valid signal.

43. The frequency scanning process claimed in claim 42 wherein the electronically entering includes, when that case is present, also electronically entering into the storage at least one identifier representing one or more of the empty signal channels.

44. The frequency scanning process claimed in claim 42 wherein the accessing of the storage includes operating the storage as a cyclic buffer.

45. The frequency scanning process claimed in claim 42 further comprising then selectively testing each of the signal channels and image channels singly or in combination for validity.

46. The frequency scanning process claimed in claim 42 further comprising, when that case is absent, selectively testing at least one of the channels in the current plurality of signal channels for validity.

47. The frequency scanning process claimed in claim 42 further comprising, when that case is absent, selectively testing each of the channels in the plurality of image channels for validity and entering one or more identifiers representing the invalid image channels into the storage.

48. The frequency scanning process claimed in claim 42 wherein the electronically entering includes, when that case is present, electronically entering into the storage three identifiers respectively representing the empty image channels.

49. The frequency scanning process claimed in claim 48 wherein the electronically entering includes, when that case is present, also electronically entering into the storage one identifier representing a signal channel in the filtered signal channel bandwidth situated in an advanced position in the tuning direction.

* * * * *